United States Patent [19]

Nakamura et al.

[11] E Patent Number: Re. 33,632

[45] Reissued Date of Patent: Jul. 9, 1991

[54] ENCODING/DECODING SYSTEM

[75] Inventors: Kozo Nakamura, Hitachioota; Yasuyuki Kojima; Nagaharu Hamada, both of Hitachi, all of Japan

[73] Assignee: Hitachi, Ltd., Tokyo, Japan

[21] Appl. No.: 209,935

[22] Filed: Jun. 22, 1988

Related U.S. Patent Documents

Reissue of:

[64] Patent No.: 4,597,016
Issued: Jun. 24, 1986
Appl. No.: 568,413
Filed: Jan. 5, 1984

[30] Foreign Application Priority Data

Jan. 10, 1983 [JP] Japan ..... 58-1071

[51] Int. Cl.[5] ..... H04M 1/40; H04M 7/13

[52] U.S. Cl. ..... 358/261.1; 358/426; 358/261

[58] Field of Search ..... 358/261.3, 261.1, 426

[56] References Cited

U.S. PATENT DOCUMENTS

| | | | |
|---|---|---|---|
| 3,927,251 | 12/1978 | White et al. | 358/261 |
| 3,991,267 | 11/1976 | Beaudette | 358/260 |
| 4,040,093 | 8/1977 | Nakagone et al. | 358/261 |
| 4,048,656 | 9/1977 | Ishii et al. | 358/261 |
| 4,115,815 | 9/1978 | Nakagone et al. | 358/260 |
| 4,117,517 | 9/1978 | Shintani et al. | 358/260 |
| 4,156,880 | 5/1979 | Yamada | 358/261 |
| 4,212,035 | 7/1980 | Nakagome et al. | 358/260 |
| 4,245,257 | 1/1981 | Yamazaki et al. | 358/260 |
| 4,258,392 | 3/1981 | Yamazaki et al. | 358/260 |
| 4,486,784 | 12/1984 | Abraham et al. | 358/261.3 |
| 4,631,598 | 12/1986 | Burkhardt et al. | 358/426 |

*Primary Examiner*—Edward L. Coles, Sr.
*Attorney, Agent, or Firm*—Antonelli, Terry, Stout & Kraus

[57] ABSTRACT

An encoding/decoding system to be connected to an external microcomputer, video memory, photoelectric reader or printer comprises an address generator for generating an address to access the video memory word by word, a transition point detector for parallelly processing a video signal word by word to detect a color information transition point address, and execution unit for calculating an address difference from two color information transition point addresses or the color information transition point address based on a difference between two color information transition point addresses, an encoding/decoding table for converting an address difference to a code word and converting a code word to an address difference, and a decoded video signal generator for parallelly reproducing a video signal based on the address difference.

12 Claims, 25 Drawing Sheets

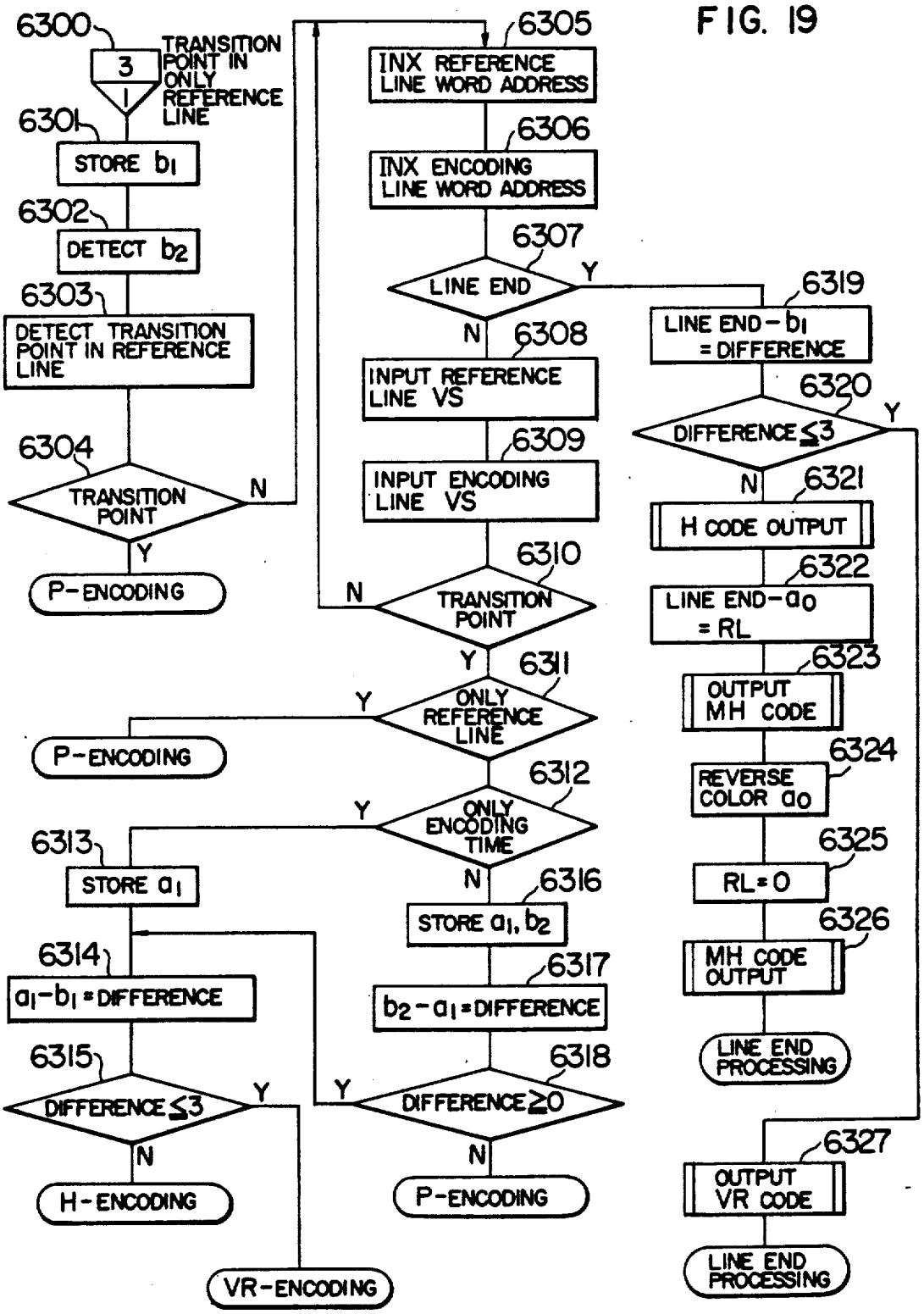
FIG. 19
6300
3
1
TRANSITION POINT IN ONLY REFERENCE LINE
6301
STORE b1
6302
DETECT b2
6303
DETECT TRANSITION POINT IN REFERENCE LINE
6304
TRANSITION POINT
N
Y
P-ENCODING
6305
INX REFERENCE LINE WORD ADDRESS
6306
INX ENCODING LINE WORD ADDRESS
6307
LINE END
Y
N
6308
INPUT REFERENCE LINE VS
6309
INPUT ENCODING LINE VS
6310
TRANSITION POINT
N
Y
6311
ONLY REFERENCE LINE
Y
P-ENCODING
6312
ONLY ENCODING TIME
Y
N
6313
STORE a1
6314
a1-b1=DIFFERENCE
6315
DIFFERENCE≦3
Y
N
H-ENCODING
VR-ENCODING
6316
STORE a1, b2
6317
b2-a1=DIFFERENCE
6318
DIFFERENCE≧0
Y
N
P-ENCODING
6319
LINE END-b1 =DIFFERENCE
6320
DIFFERENCE≦3
Y
N
6321
H CODE OUTPUT
6322
LINE END-a0 =RL
6323
OUTPUT MH CODE
6324
REVERSE COLOR a0
6325
RL=0
6326
MH CODE OUTPUT
LINE END PROCESSING
6327
OUTPUT VR CODE
LINE END PROCESSING

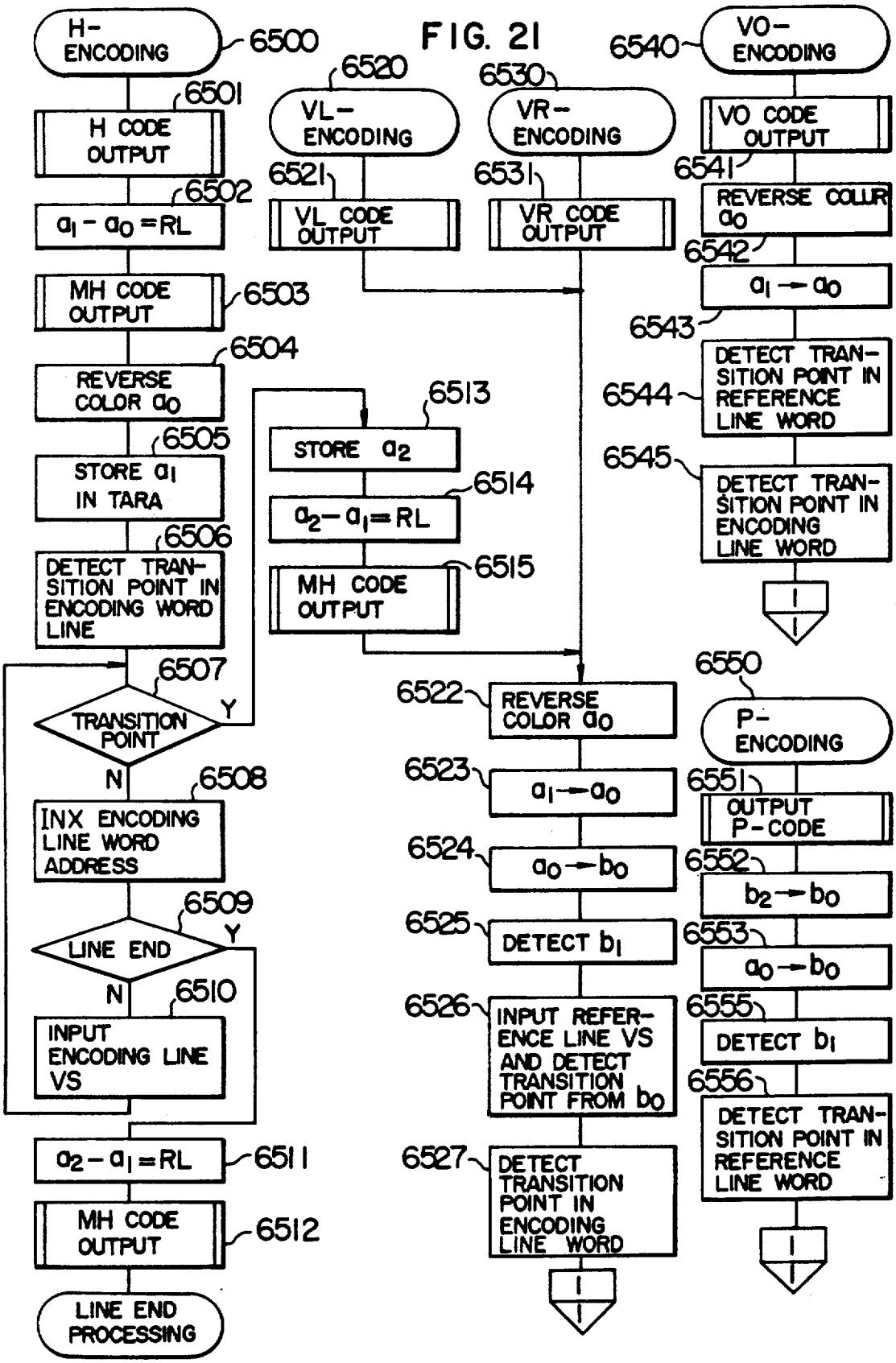
FIG. 21
H-ENCODING
6500
H CODE OUTPUT
6501
a1 - a0 = RL
6502
MH CODE OUTPUT
6503
REVERSE COLOR a0
6504
STORE a1 IN TARA
6505
DETECT TRANSITION POINT IN ENCODING WORD LINE
6506
TRANSITION POINT
6507
Y
N
INX ENCODING LINE WORD ADDRESS
6508
LINE END
6509
Y
N
INPUT ENCODING LINE VS
6510
a2 - a1 = RL
6511
MH CODE OUTPUT
6512
LINE END PROCESSING
VL-ENCODING
6520
VL CODE OUTPUT
6521
STORE a2
6513
a2 - a1 = RL
6514
MH CODE OUTPUT
6515
VR-ENCODING
6530
VR CODE OUTPUT
6531
REVERSE COLOR a0
6522
a1 → a0
6523
a0 → b0
6524
DETECT b1
6525
INPUT REFERENCE LINE VS AND DETECT TRANSITION POINT FROM b0
6526
DETECT TRANSITION POINT IN ENCODING LINE WORD
6527
VO-ENCODING
6540
VO CODE OUTPUT
6541
REVERSE COLUR a0
6542
a1 → a0
6543
DETECT TRANSITION POINT IN REFERENCE LINE WORD
6544
DETECT TRANSITION POINT IN ENCODING LINE WORD
6545
P-ENCODING
6550
OUTPUT P-CODE
6551
b2 → b0
6552
a0 → b0
6553
DETECT b1
6555
DETECT TRANSITION POINT IN REFERENCE LINE WORD
6556

ENCODING/DECODING SYSTEM

Matter enclosed in heavy brackets [ ] appears in the original patent but forms no part of this reissue specification; matter printed in italics indicates the additions made by reissue.

The present invention relates to an encoder/decoder for an MH code (modified Huffman code) and an MR code (modified READ code) which are international standards in the art of a high speed facsimile.

Figure 1:
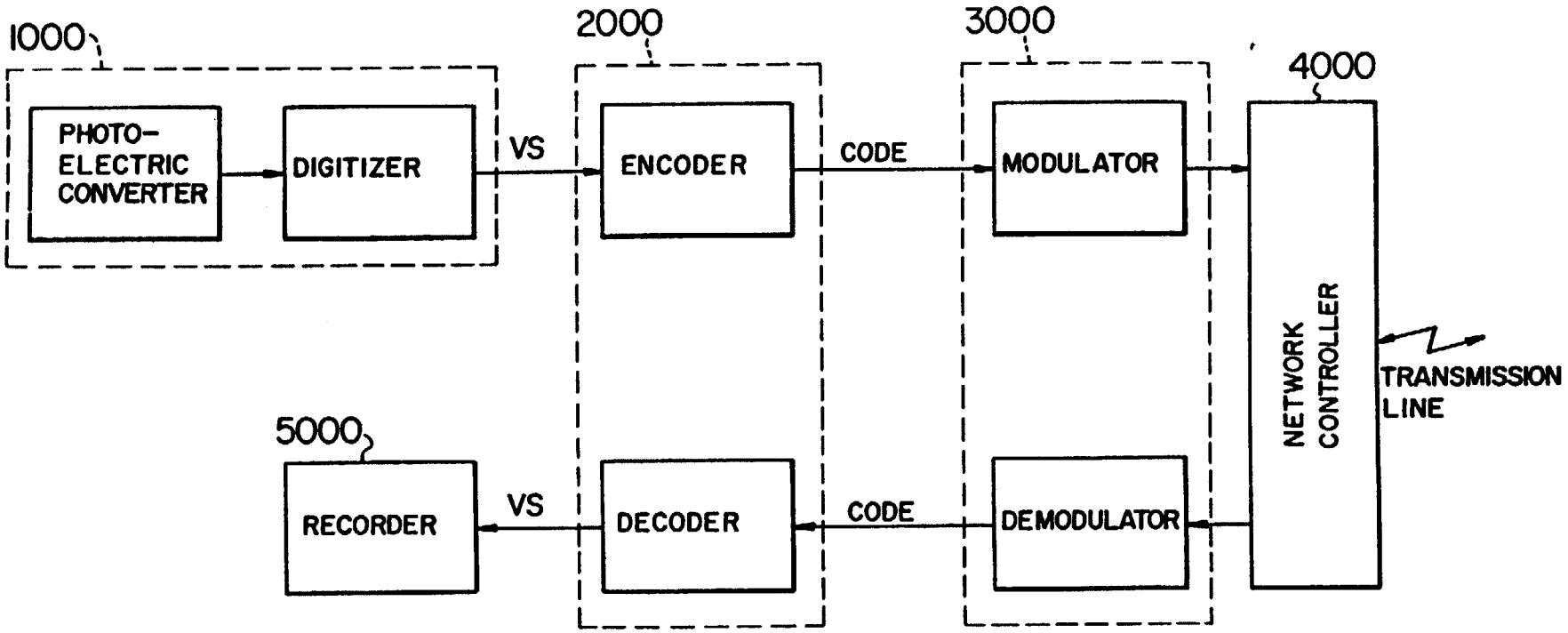
FIG. 1 PRIOR ART

FIG. 1 is a block diagram schematically showing a facsimile machine. In the facsimile an original document is scanned by a scanner 1000 to generate a video signal VS. The video signal is converted to a code word by an encoder/decoder 2000, and it is converted to a frequency in a transmission line band by a modem 3000 and finally sent out to a transmission line through a network controller 4000. In a receiving station, the code words are converted to a video signal in the opposite procedure and a hard copy is formed by a recorder 5000. A controller (usually a microcomputer) which controls an overall system is omitted in FIG. 1. In the encoder/decoder 2000, the international standard MH code or MR code is used in many cases. In the MH code, a run length (RL) between two adjacent transition points (at which colors of pixels change) on the same line is converted to a code word. In the MR code, the transition points on two adjacent lines are noted and a relative positional difference between the transition point on the reference line already encoded and transmitted and the transition point on the encoding line currently being encoded is encoded. In a prior art encoder/decoder, a plurality of line memories each storing the bits of the video signal sequentially are provided and the memories are scanned serially to detect the transition point. In decoding, the video signal is serially decoded by counting the run lengths by a counter. As a result, a volume of a hardware increases and high speed memories are required. Since the MH code and the MR code are of high degree of coding scheme, they are usually processed by a combination of a software and a hardware of a microcomputer. However, since the signal processing by software is of low speed, it is difficult to encode at a high speed. When the system is constructed by a hardware only, it is of large scale and lacks a flexibility. The volume of the hardware may be reduced by providing a memory (usually an 8-bit word memory) for storing the video signal on a system bus of the microcomputer. However, since the transition point in the word is serially detected, a high speed operation is difficult to attain. In many prior art devices, a pixel-by-pixel operation to serially scan the video signal to detect the transition point is carried out by the hardware, and a process to generate the code word based on the transition point information is carried out by the software by the microcomputer. This method is flexible but imposes a heavy load to the microcomputer and it is hardly applicable to a high speed line such as 48 Kb/s.

It is an object of the present invention to provide an encoder/decoder which parallelly detects transition points word by word, one word consisting of a plurality of bits of a video signal, decodes the video signal based on transition point information, and converts the transition point information to a code word and converts the code word to the transition point information by referring an MH/MR code table so that a flexible encoding/decoding operation is carried out at a high speed in accordance with operation parameters supplied from a microcomputer.

Figure 2:
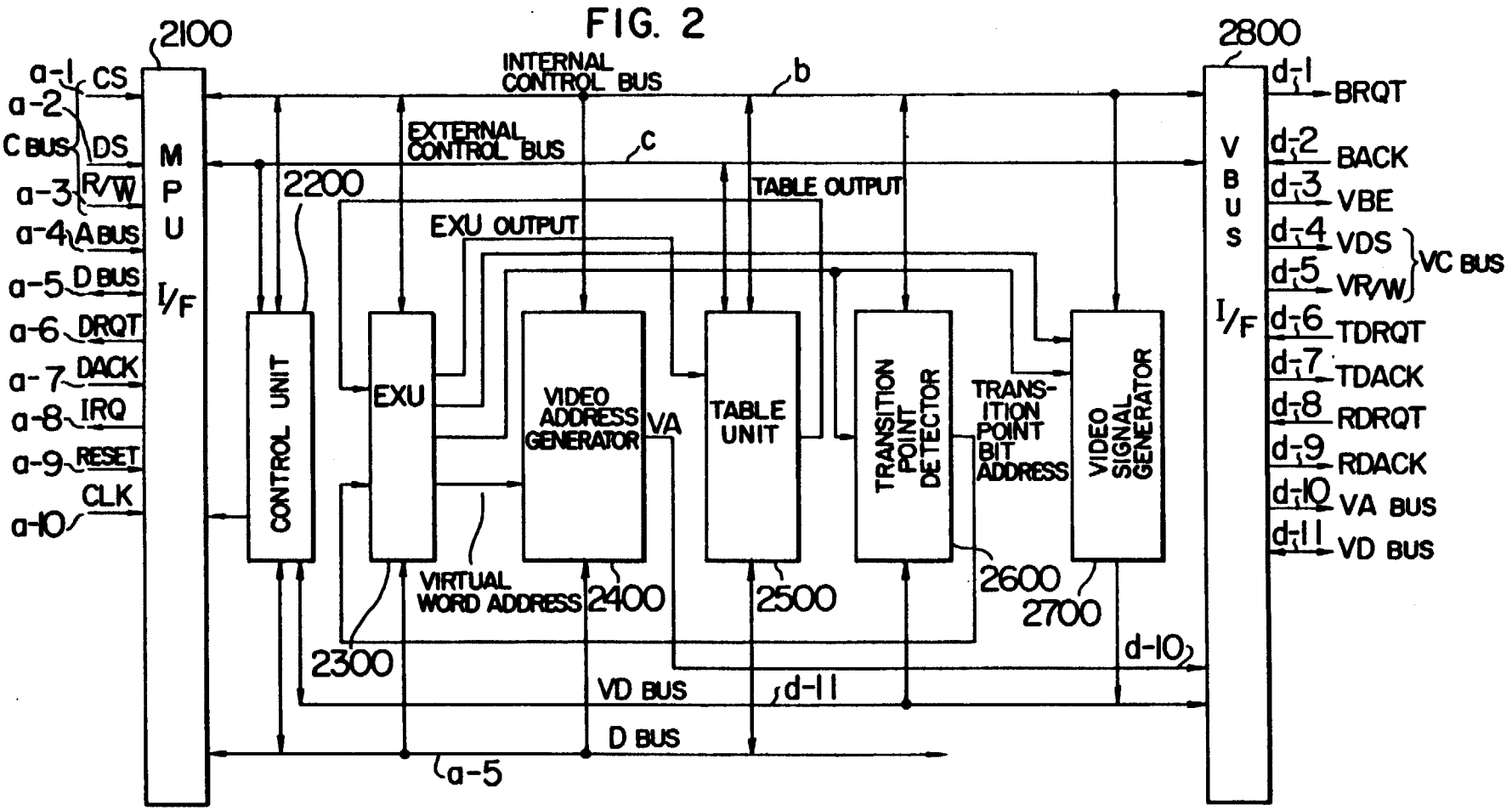
Figure 5:
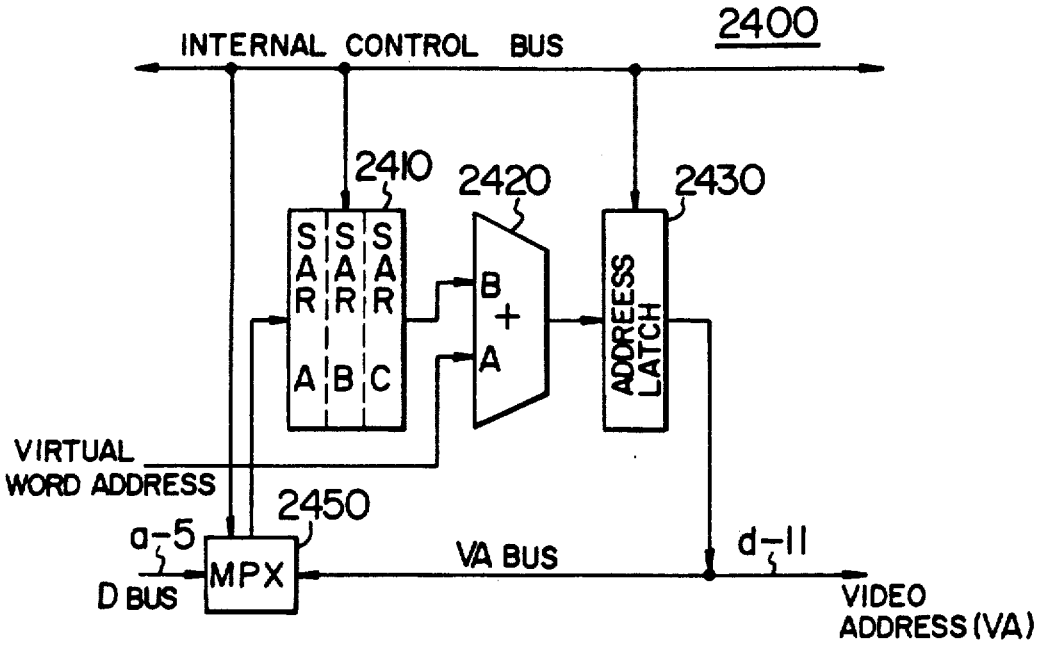
Figure 6:
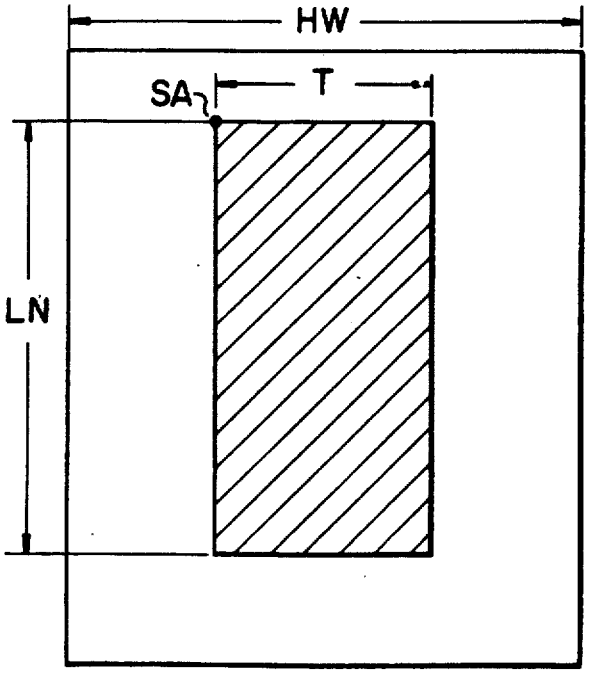
Figure 4:
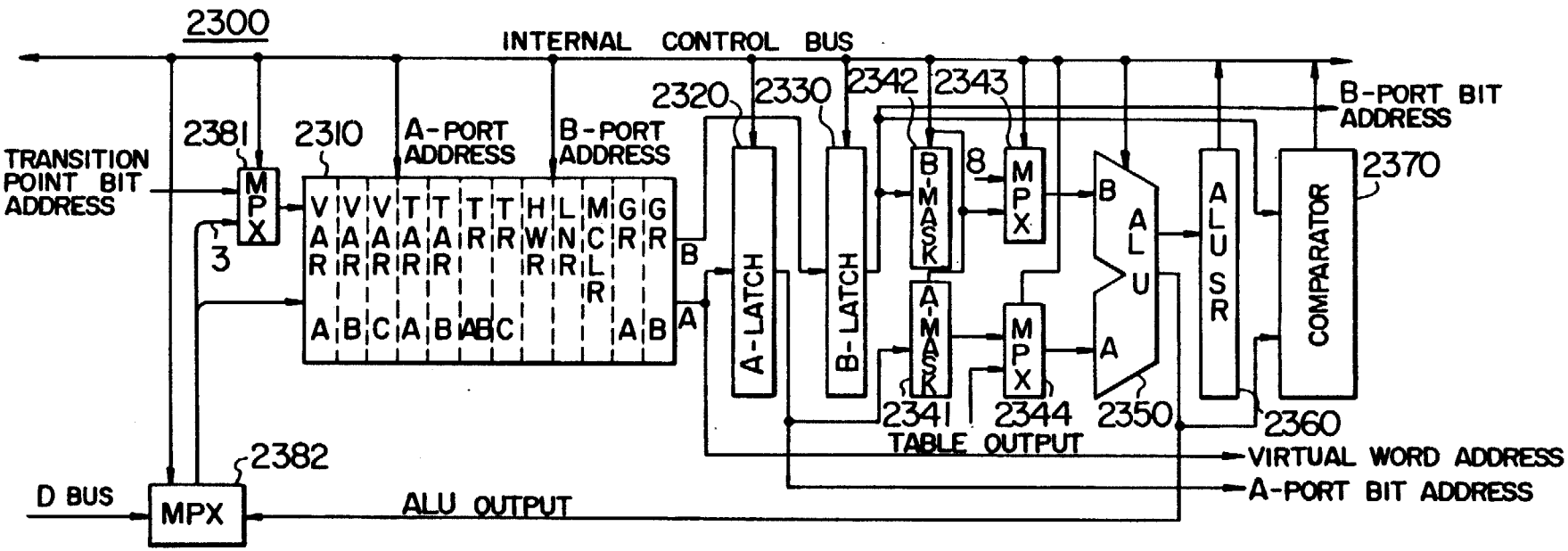
Figure 3:
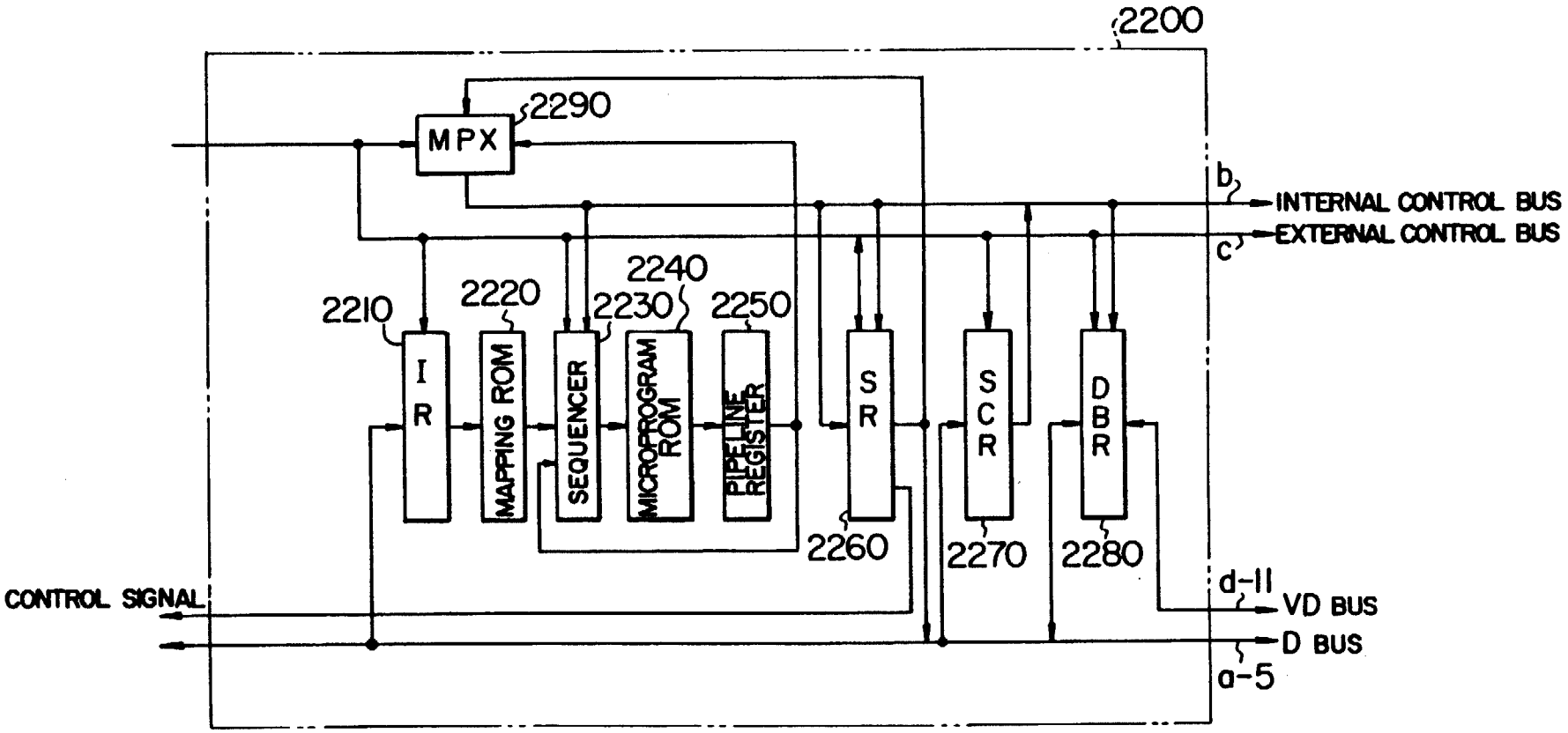
Figure 7:
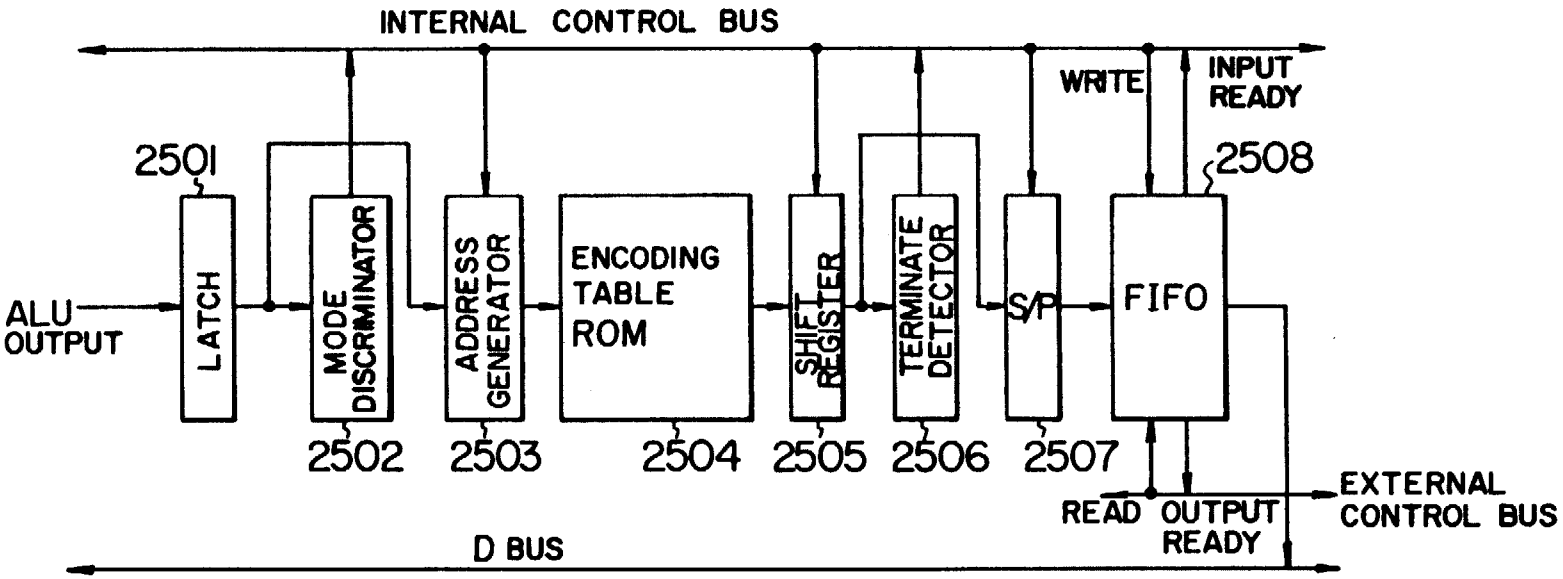
Figure 8:
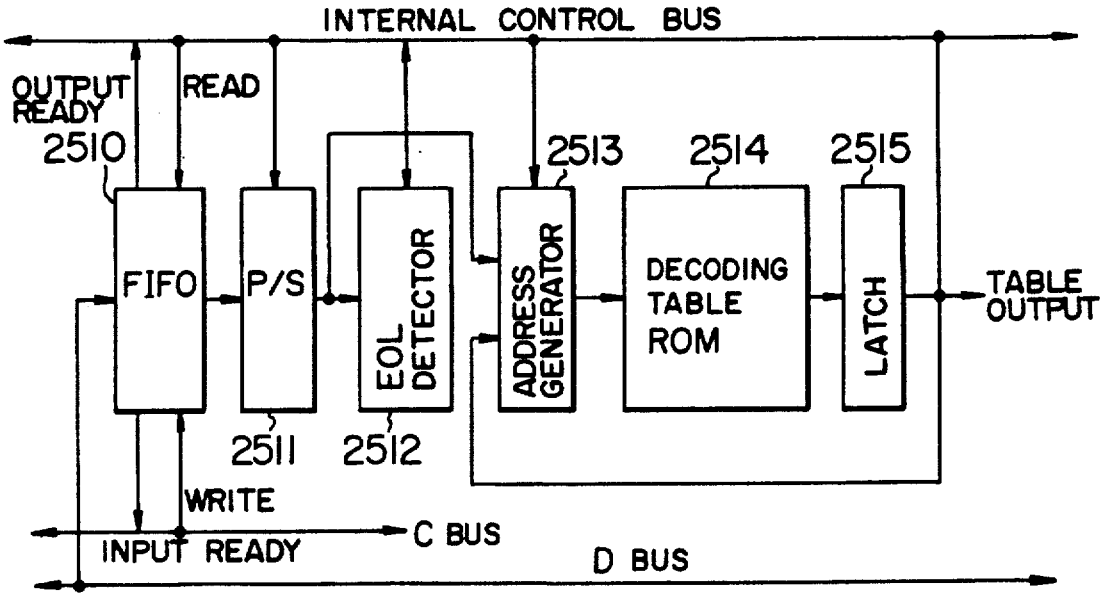
Figure 11:
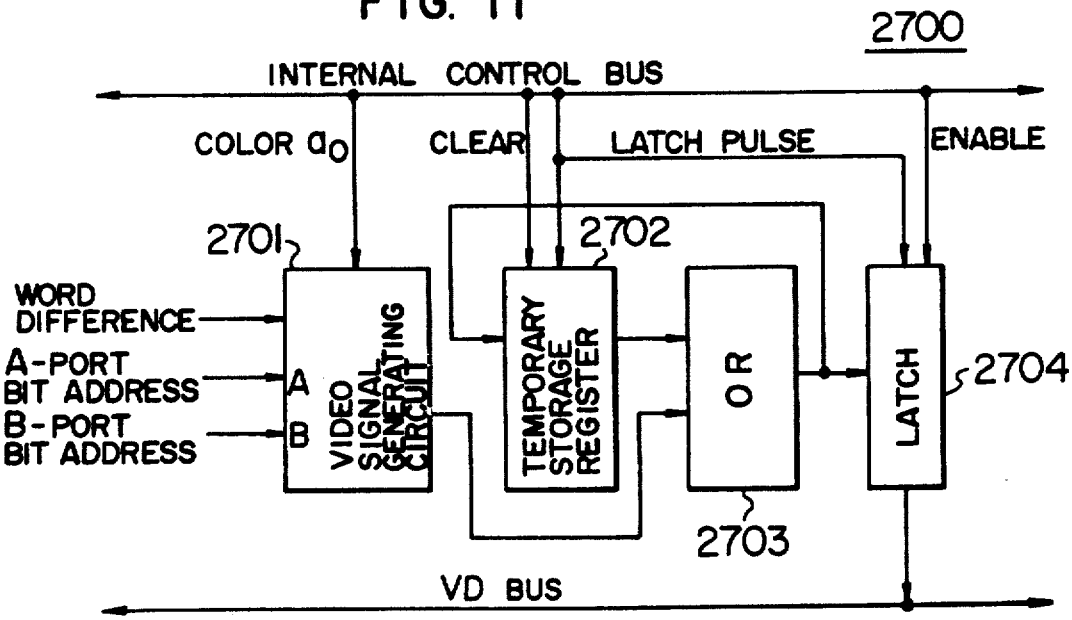
Figure 9:
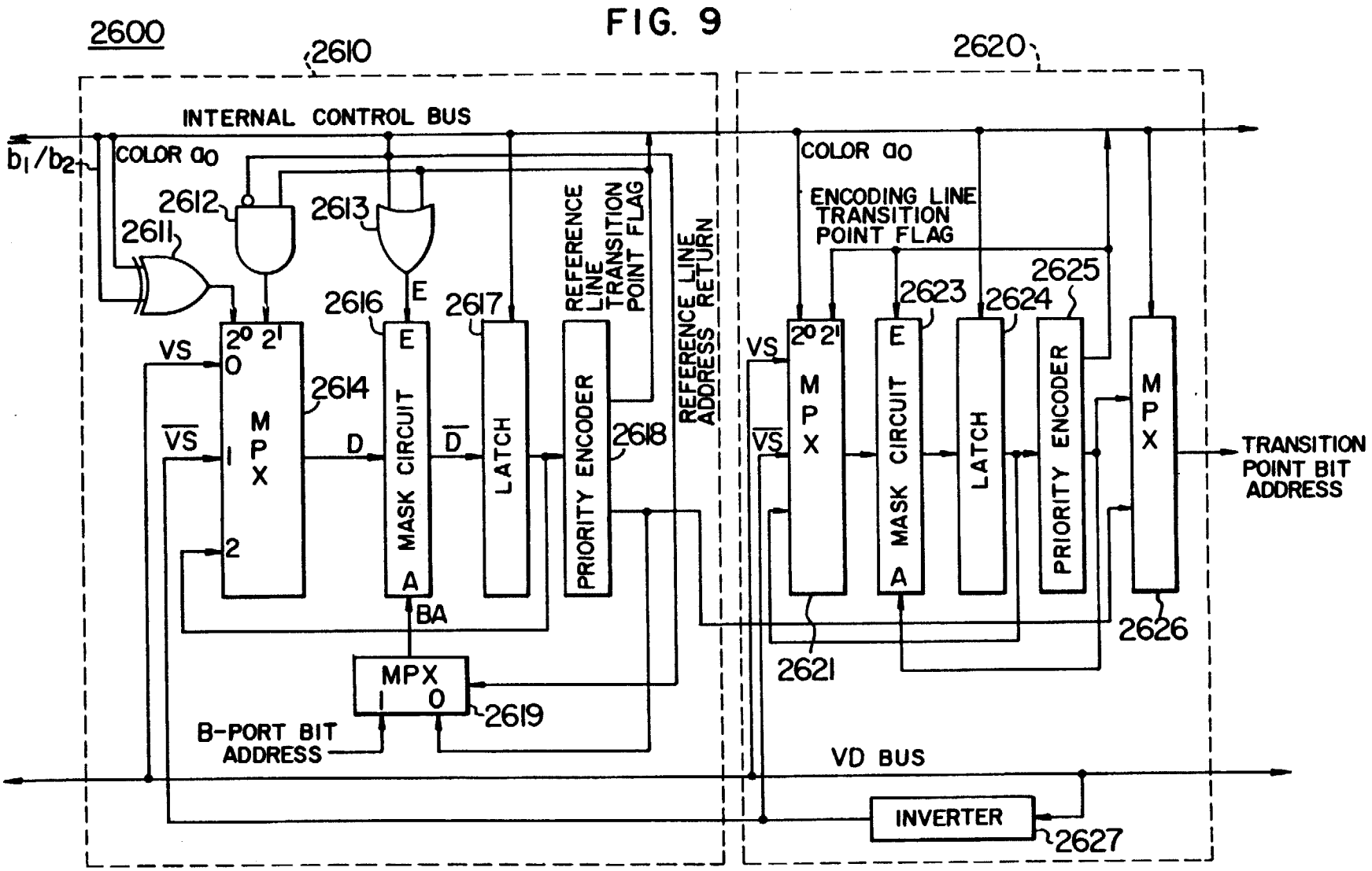
Figure 10:
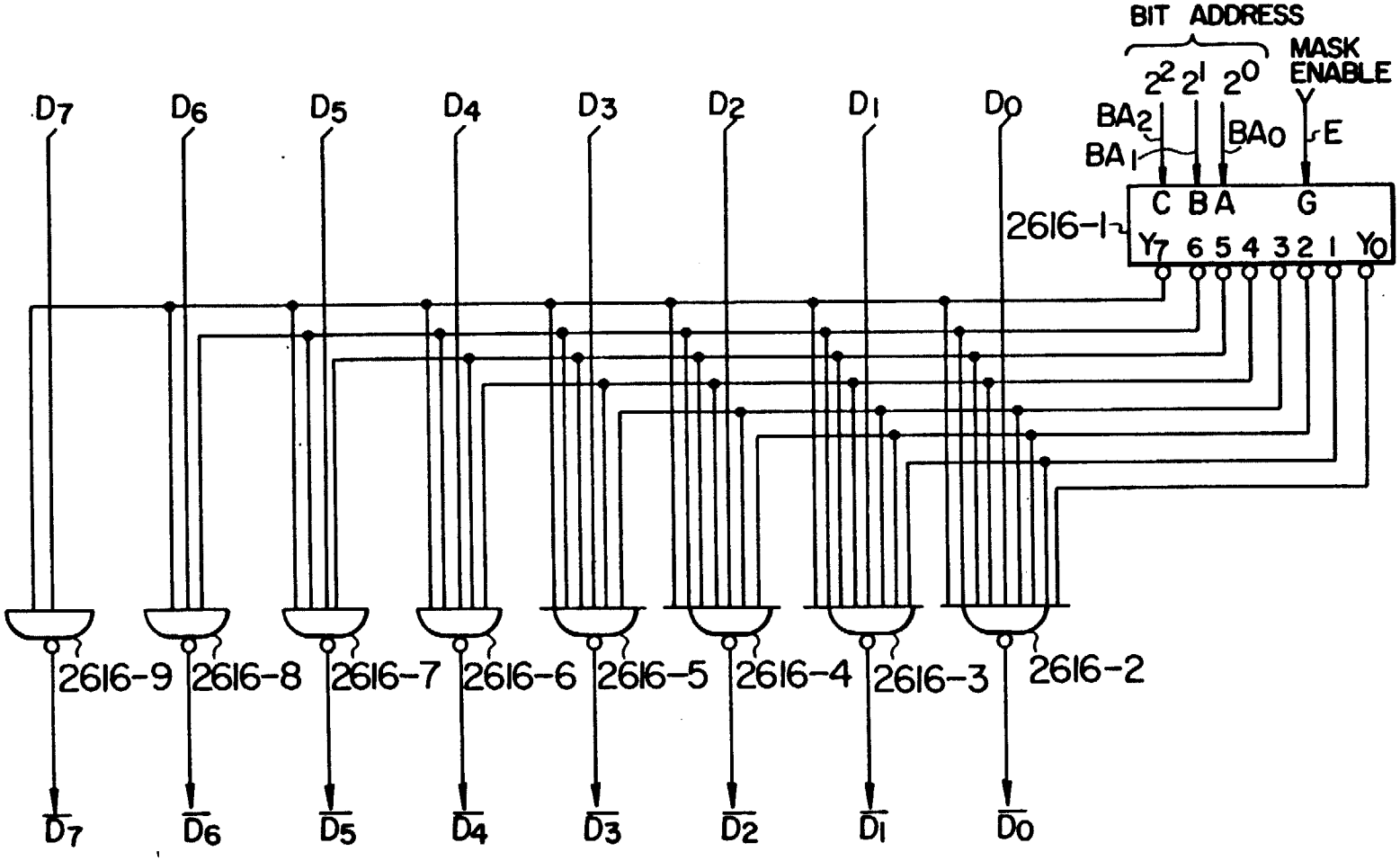
Figure 12:
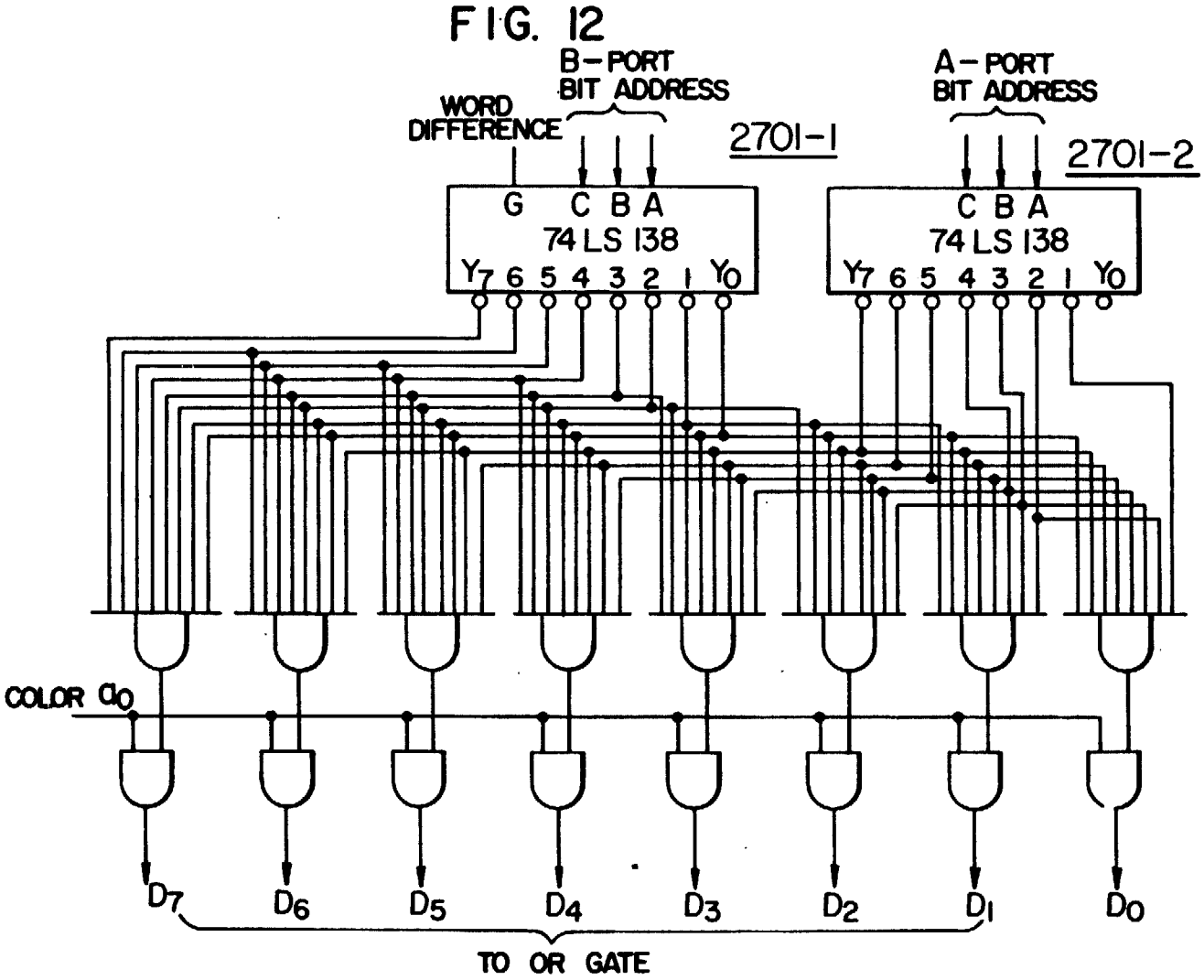
Figure 13:
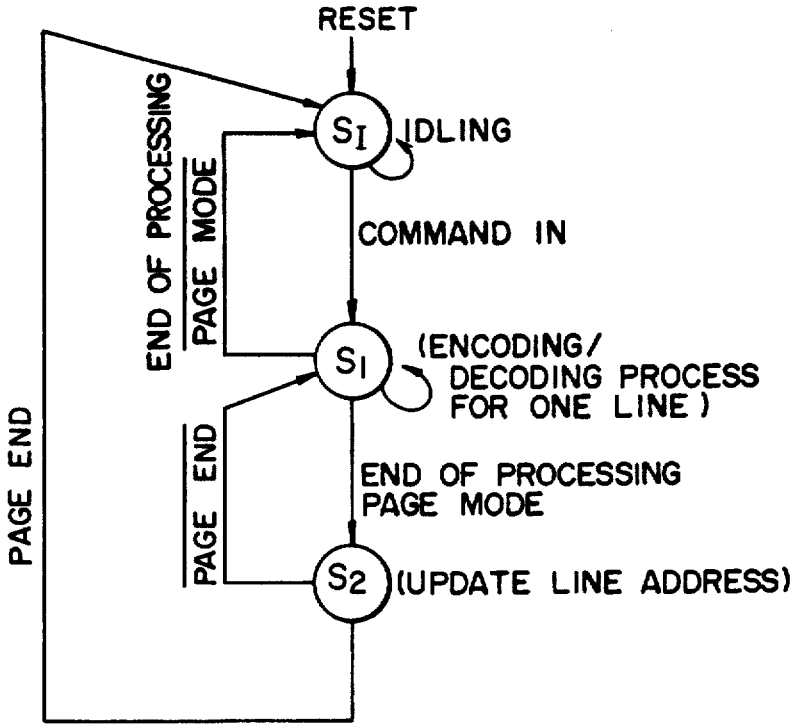
Figure 14:
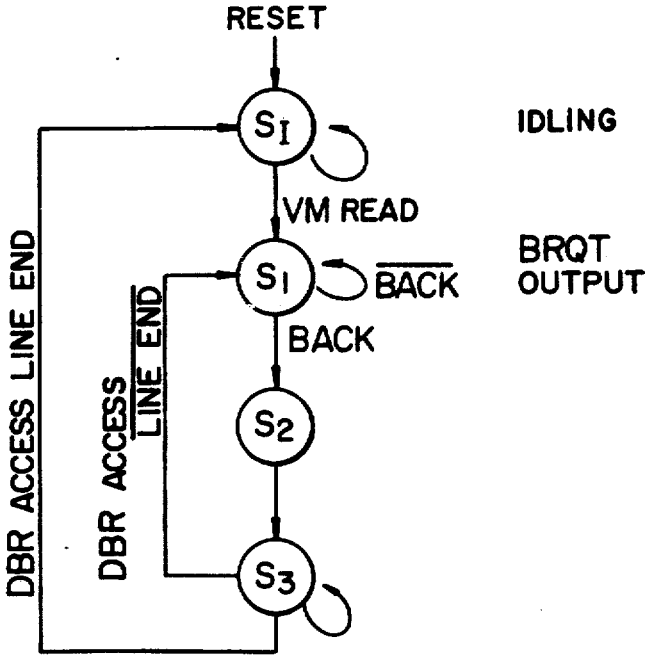
Figure 15:
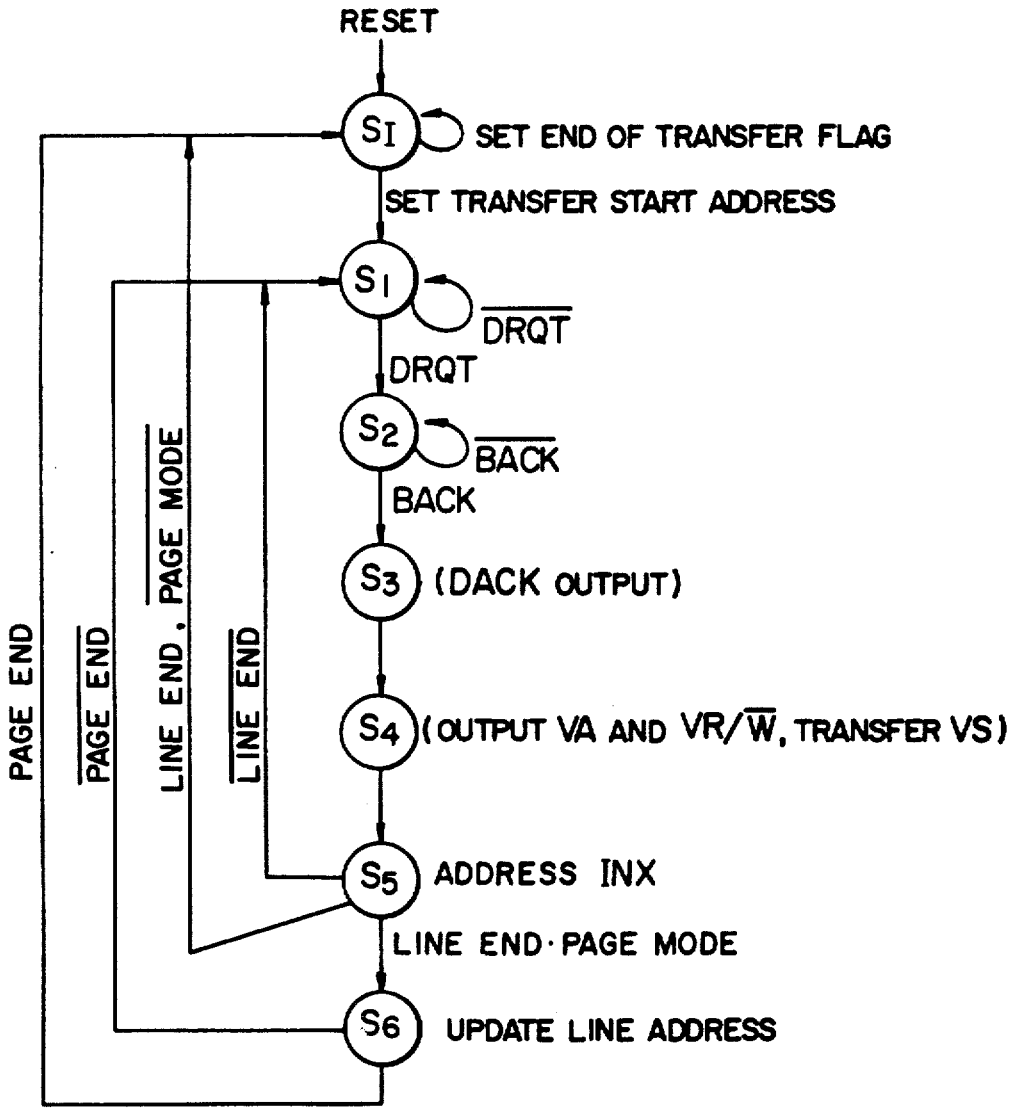
Figure 16:
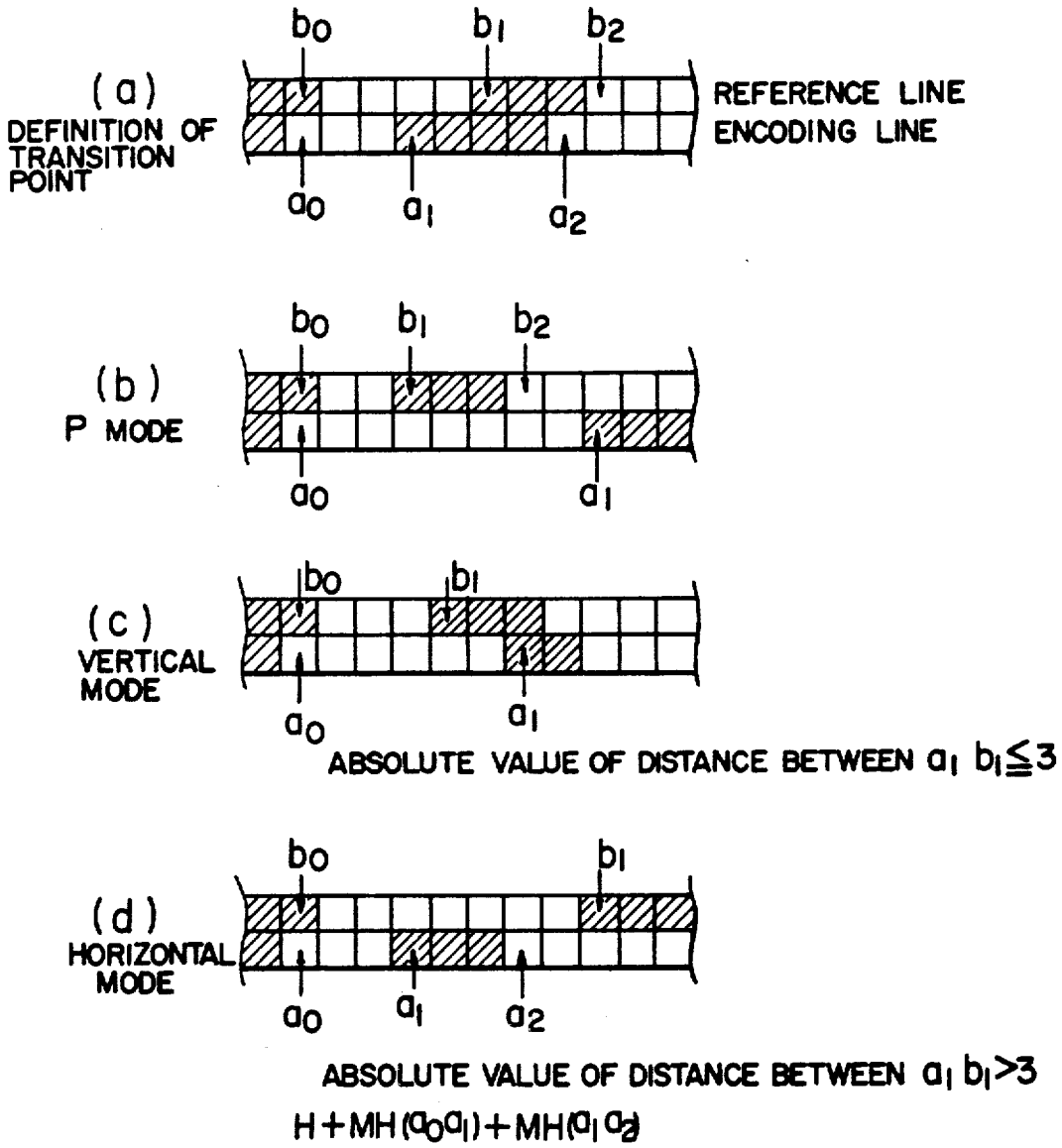
Figure 17:
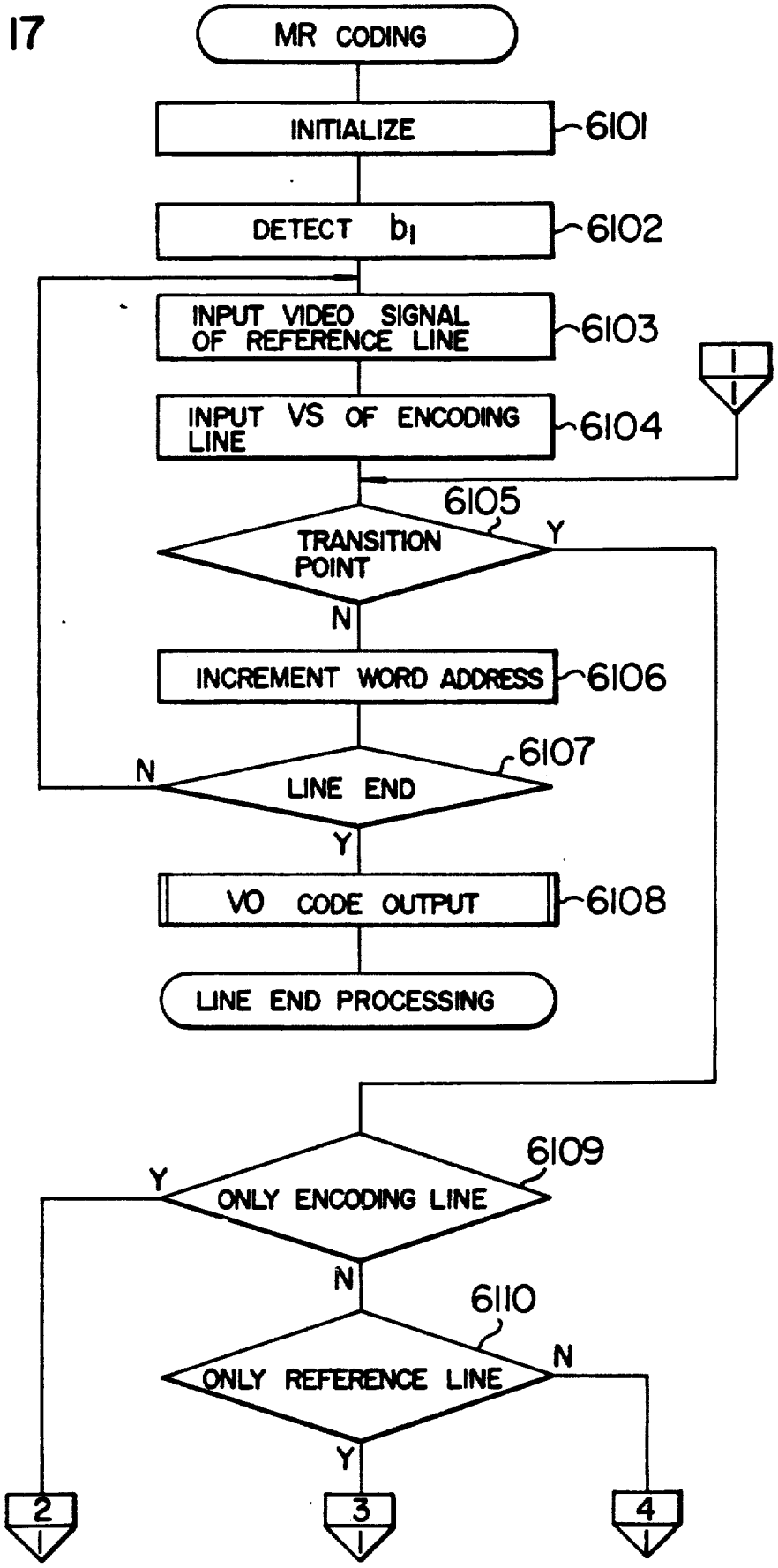
Figure 18:
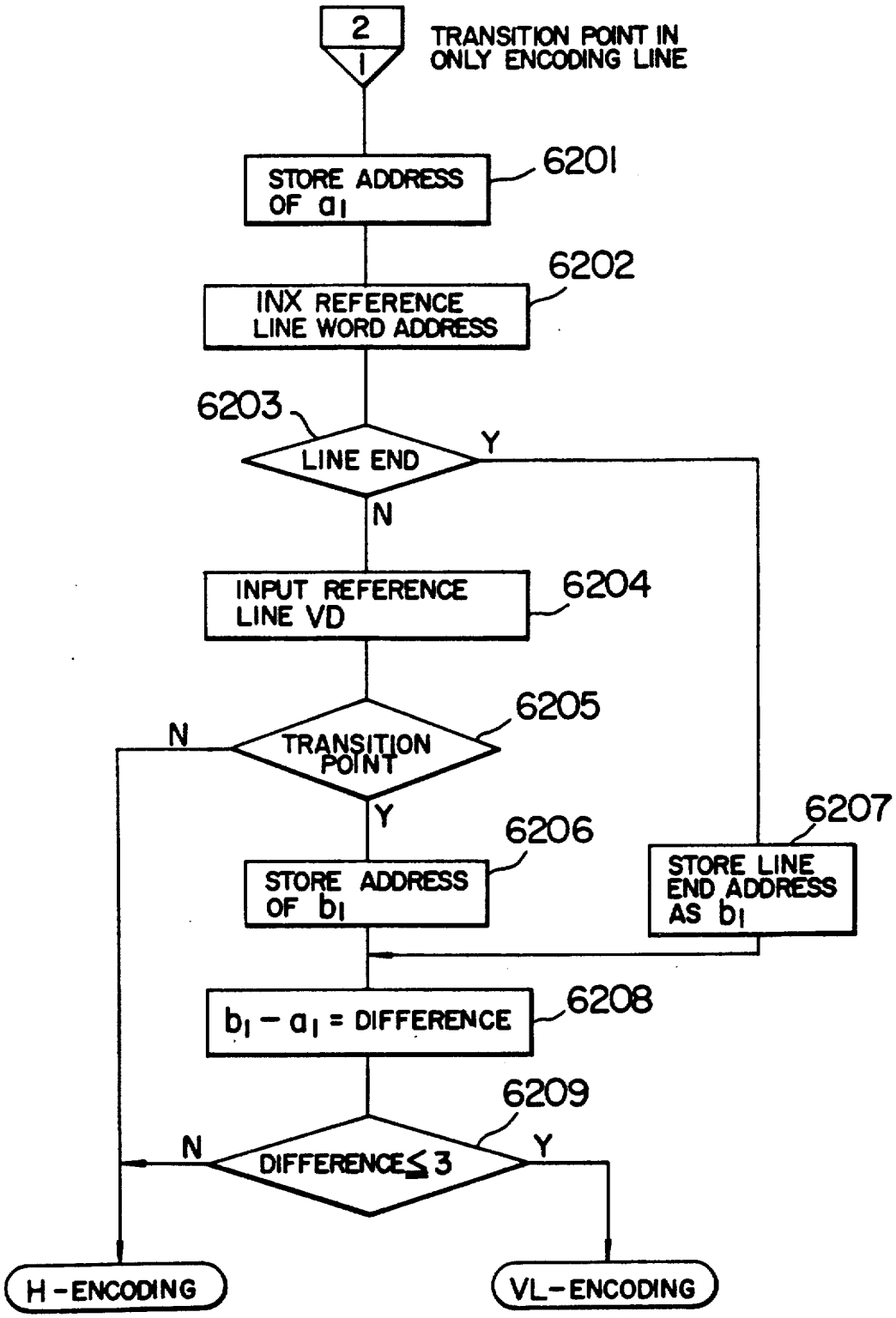
Figure 20:
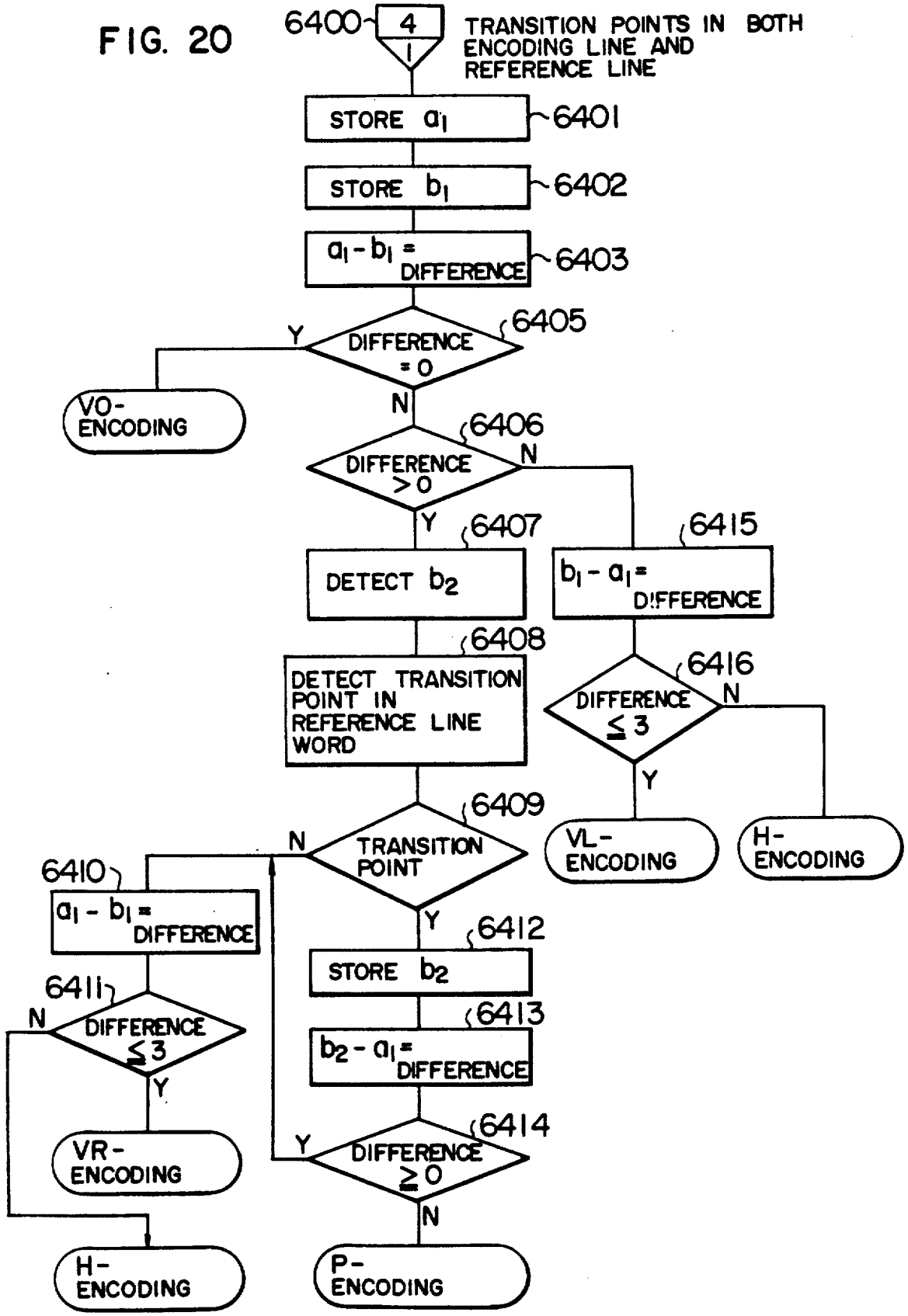
Figure 22:
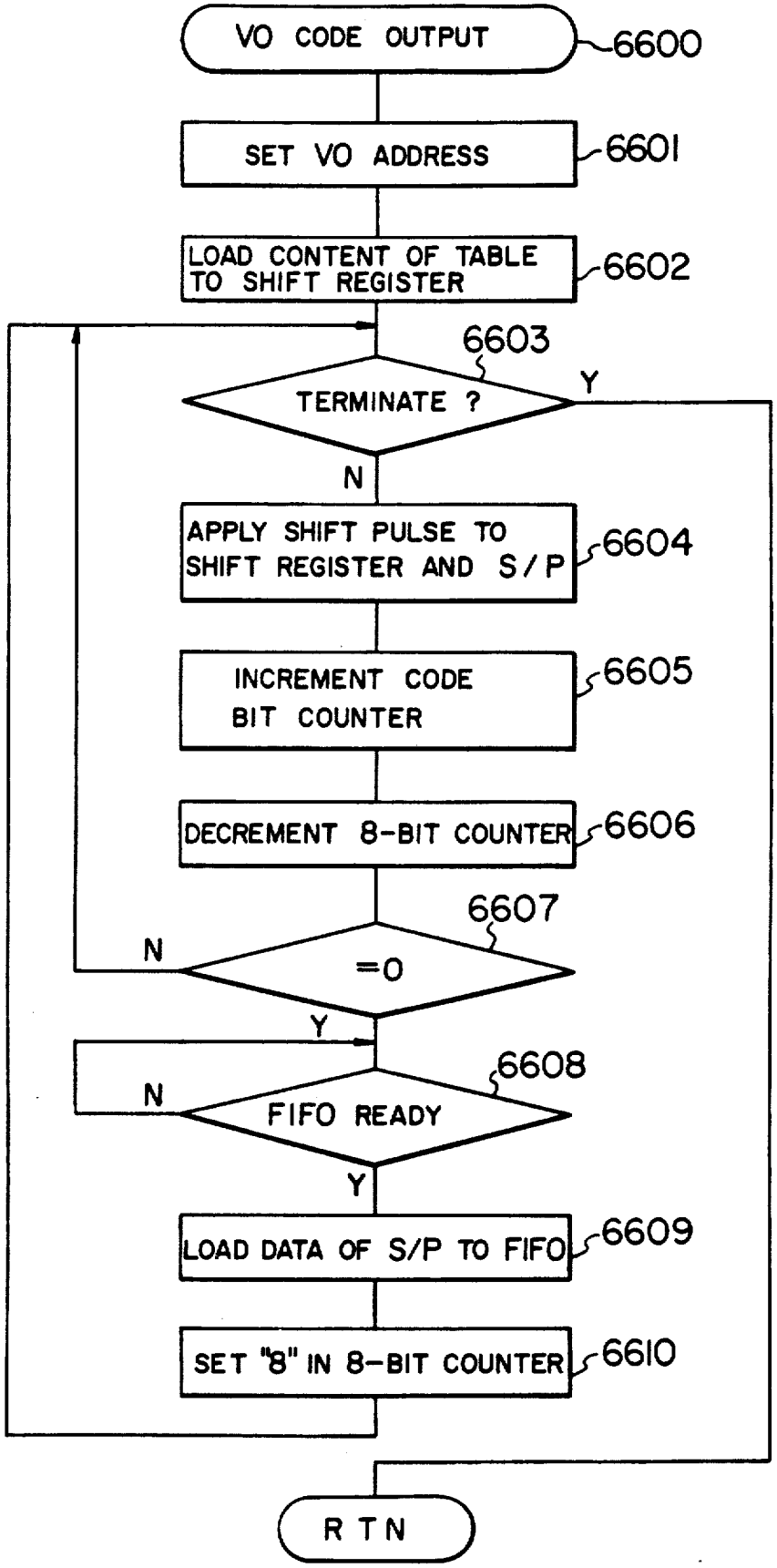
Figure 23:
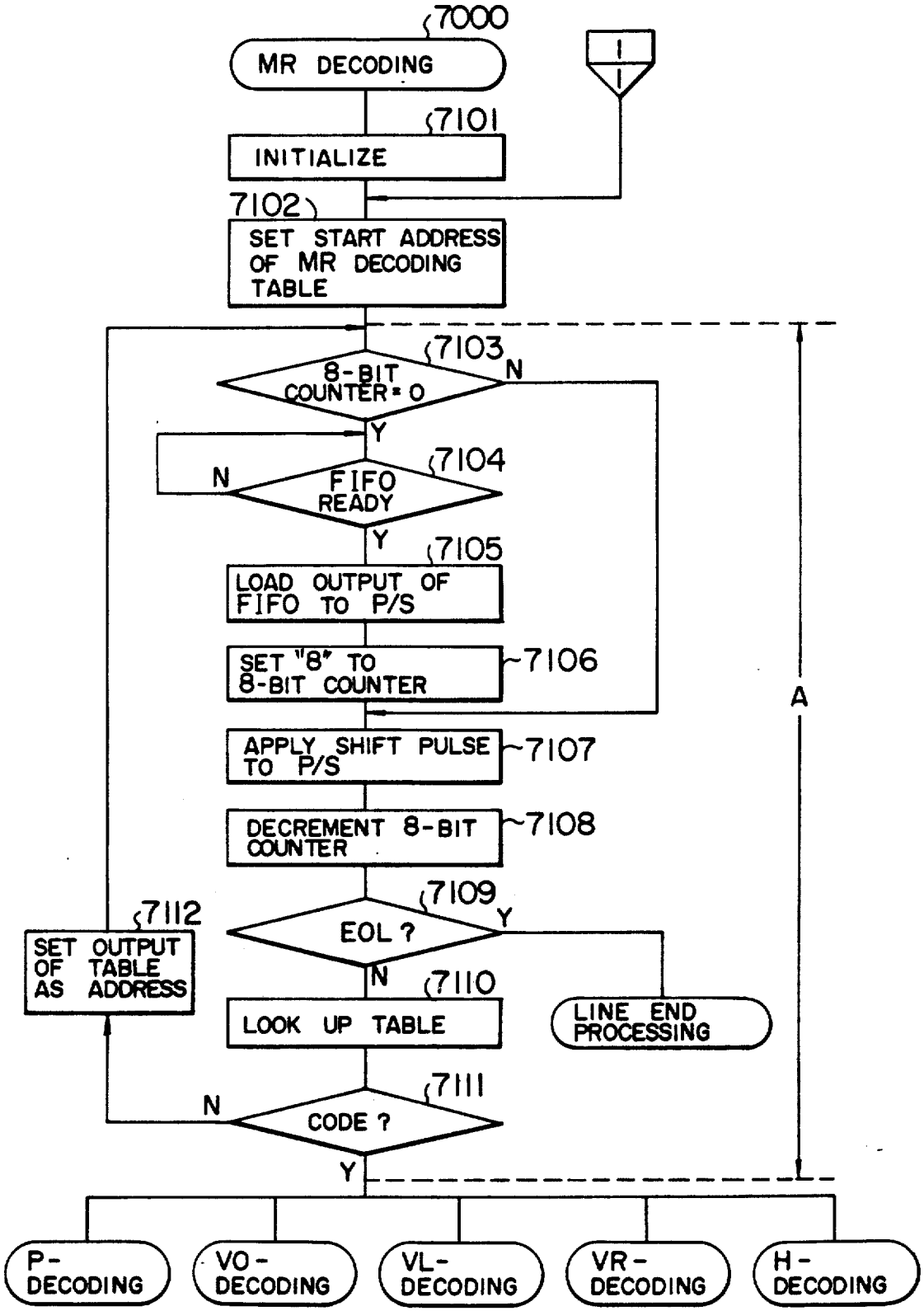
Figure 24:
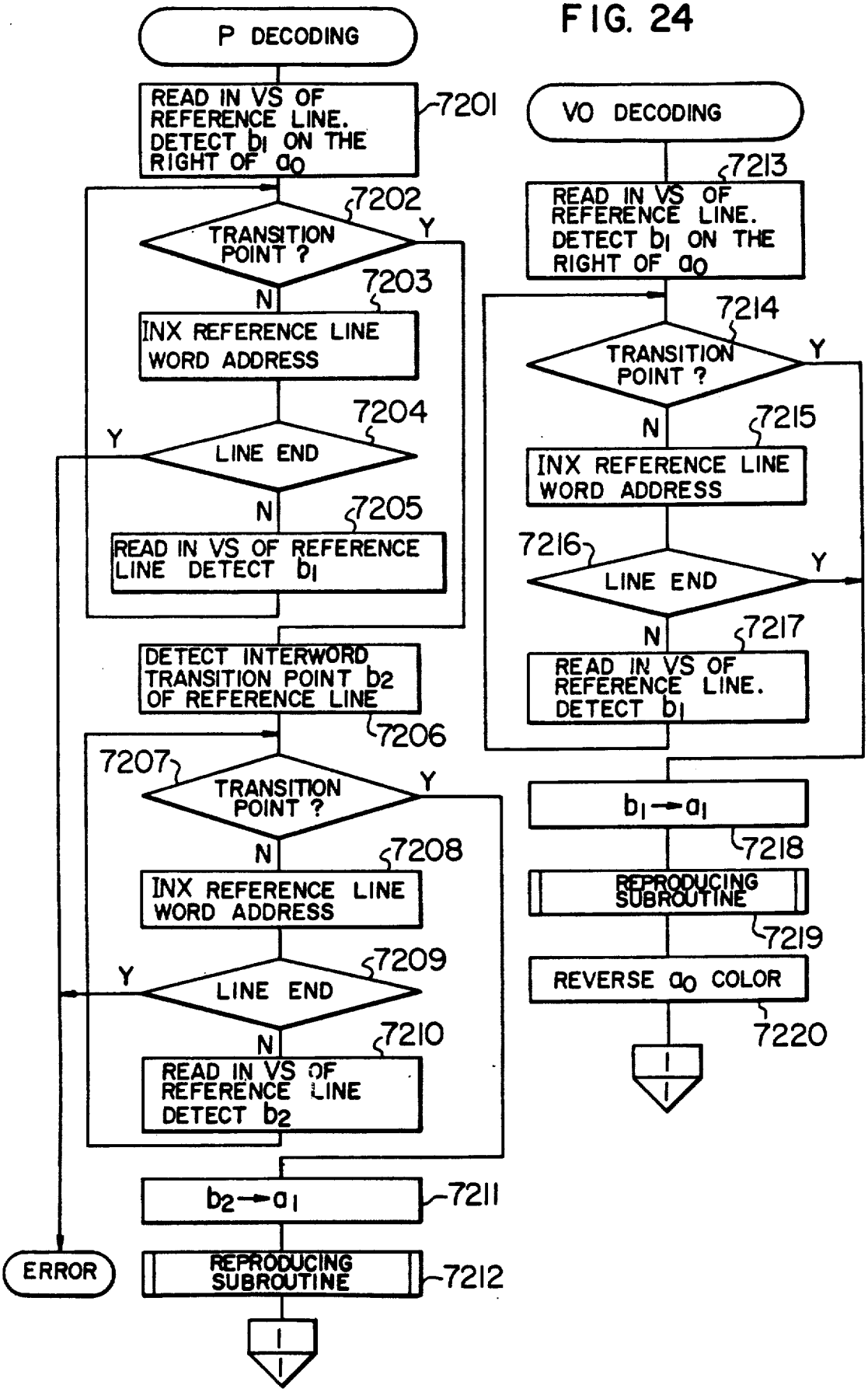
Figure 25:
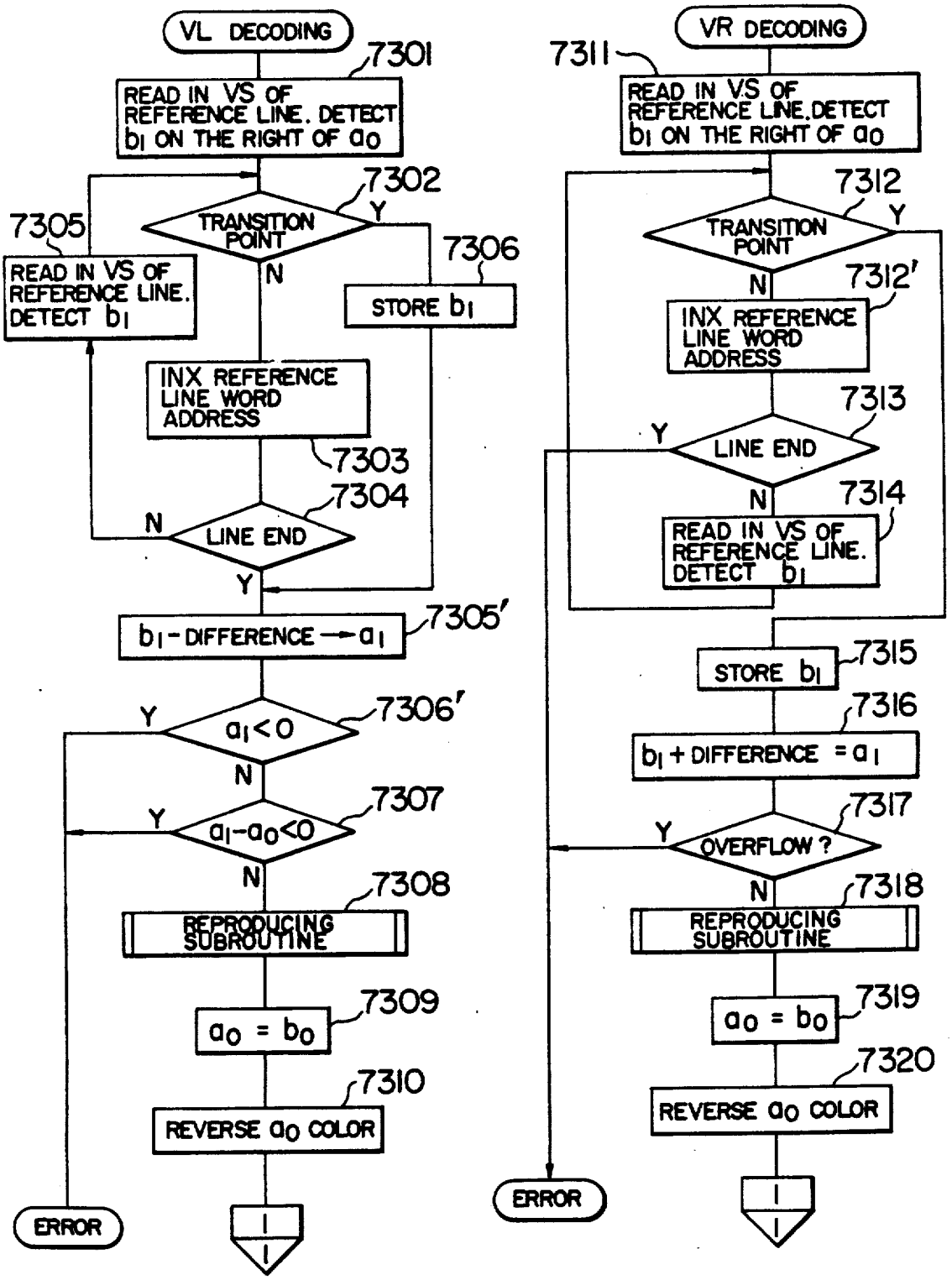
Figure 26:
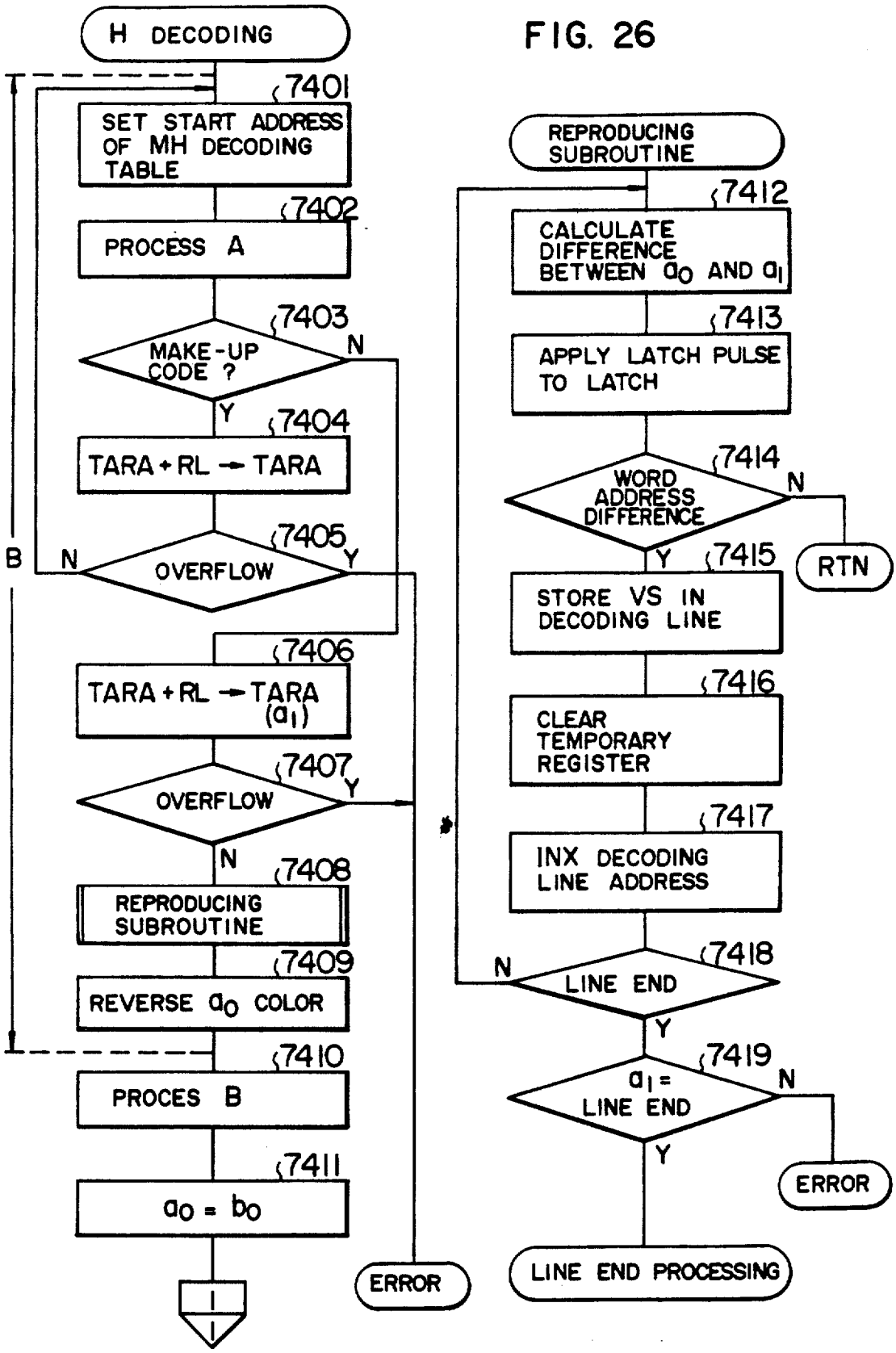
Figure 27:
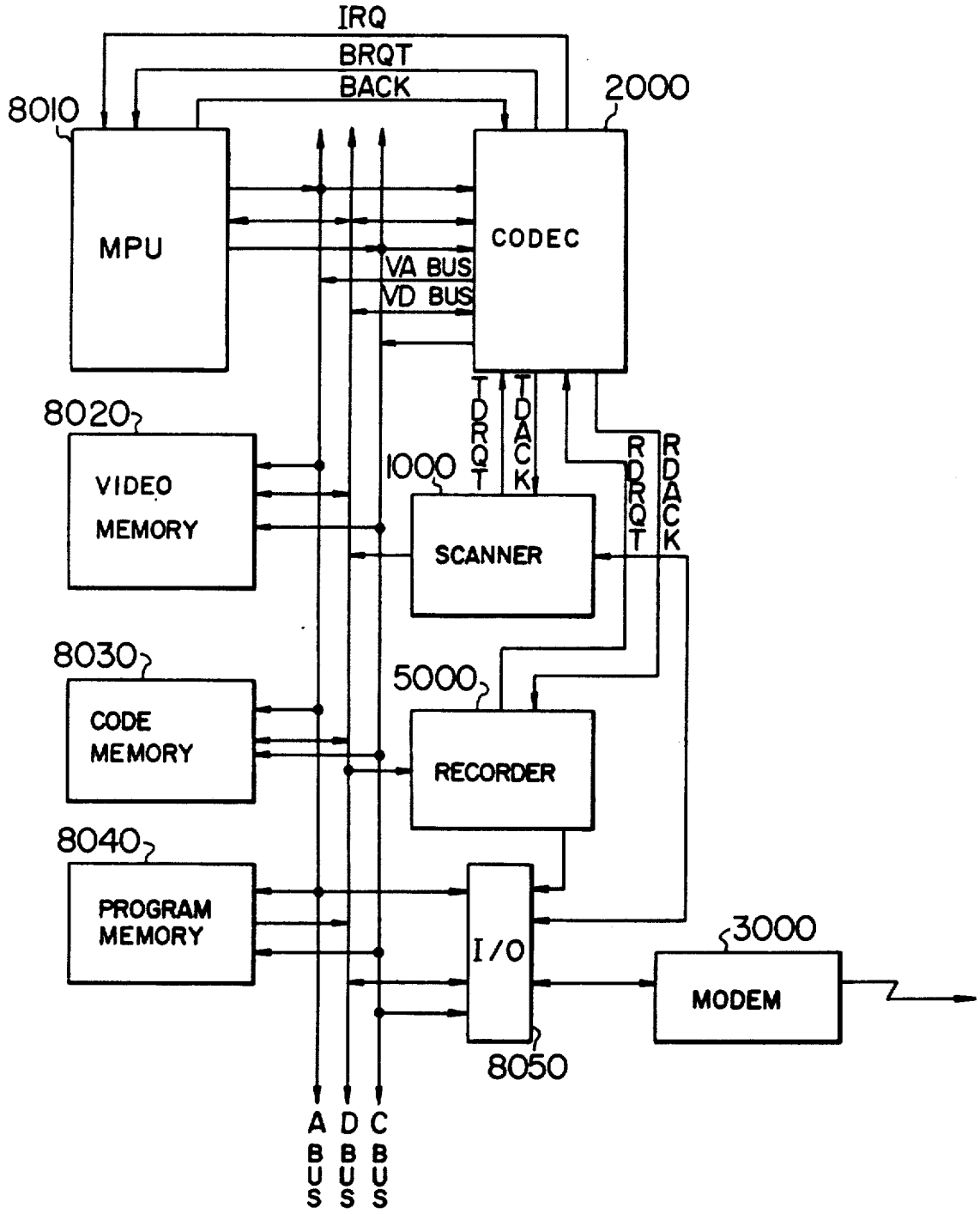
Figure 28:
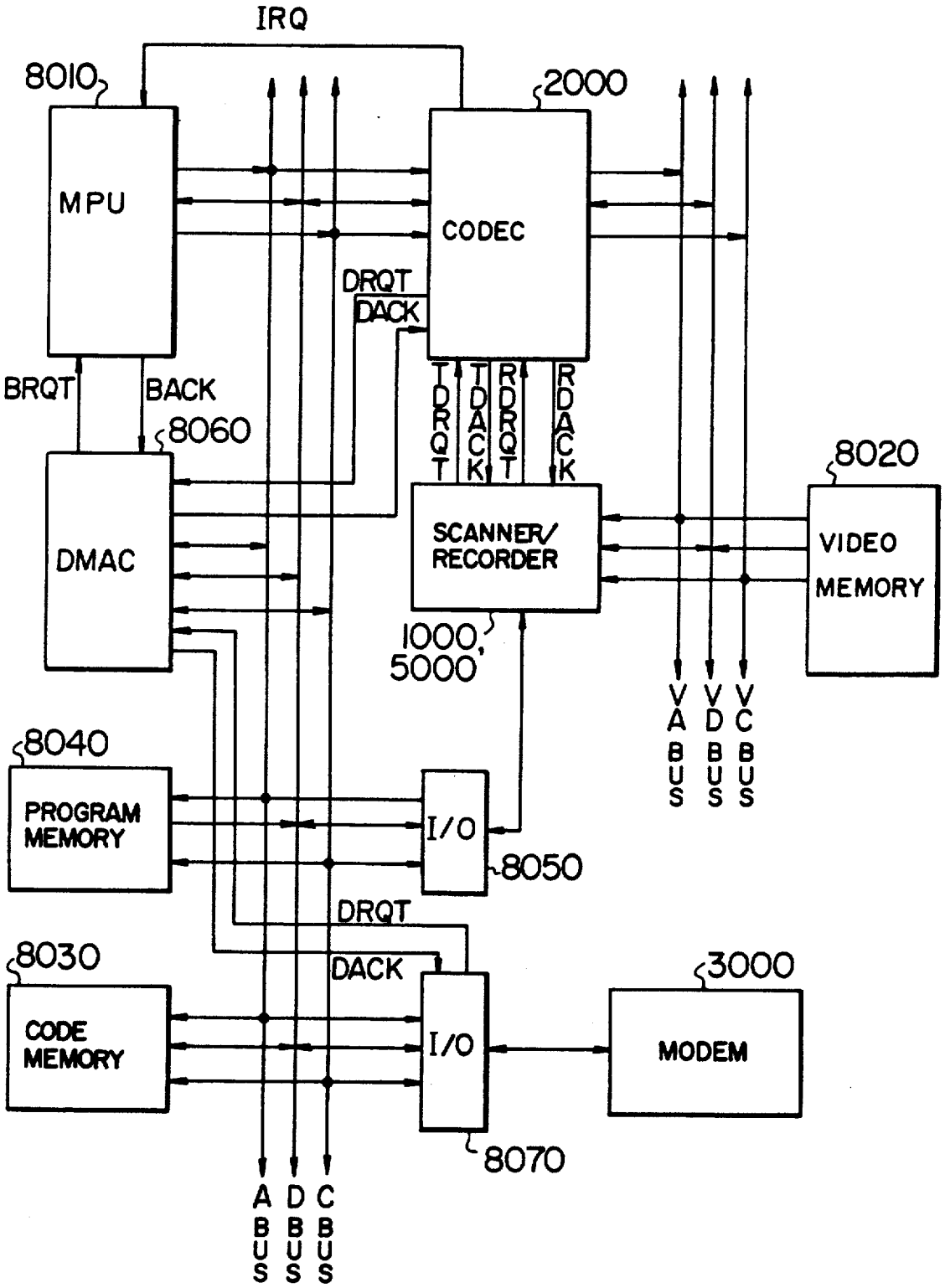

The present invention will be apparent from the following detailed description taken in conjunction with the accompanying drawings, in which:

FIG. 1 is an overall block diagram of a prior art facsimile,

FIG. 2 is an overall block diagram of an encoder/decoder (Codec) of the present invention, FIG. 3 is a block diagram of a control unit, FIG. 4 is a block diagram of an execution unit, FIG. 5 is a block diagram of a video address generator, FIG. 6 illustrates page mode processing, FIG. 7 is a block diagram of an encoding table unit, FIG. 8 is a block diagram of a decoding table unit, FIG. 9 is a block diagram of a transition point detector, FIG. 10 shows a detailed circuit diagram of a mask circuit in the transition point detector, FIG. 11 is a block diagram of a video signal generator, FIG. 12 shows a detailed circuit diagram of the video signal generator, FIG. 13 shows status transition of the Codec in encoding/decoding process, FIG. 14 shows status transition of the code when a microcomputer accesses a video memory (VM) through the Codec, FIG. 15 shows status transition of the Codec when the video signal is transferred, FIG. 16 illustrates an MR encoding scheme, FIGS. 17 to 22 show microprogram flows for the MR encoding process, FIGS. 23 to 26 show microprogram flows for the MR decoding process, and FIGS. 27 and 28 are block diagrams of a facsimile system which uses the Codec.

Preferred embodiments of the present invention are now explained with reference to FIG. 2 et seq.

FIG. 2 is an overall block diagram of the encoder/decoder (Codec) of the present invention. An MPU I/F 2100 is an interface to a microcomputer and signals a-1–a-10 are inputted thereto and outputted therefrom. The signal a-1 is a chip select (cs) signal used when the microcomputer accesses the Codec. The signal a-2 is a timing signal (data strobe (DS) signal) used when data is transferred between the microcomputer and the Codec. The signal a-3 is a read/write (R/W) signal to select read or write operation from the microcomputer to the Codec. The signals a-1–a-3 are inputted from a control bus (C bus) of a microcomputer board. The signal a-4 is an address (A) signal from the microcomputer. A signal C (called an external control signal) to access registers in the Codec from the microcomputer is generated based on the signals a-1–a-4. The signal a-5 is used when the data (D) is exchanged between the microcomputer and the Codec and it is applied directly to a data bus (D bus) of the microcomputer. The signal a-6 is a DMA request (DRQT) signal to request a data transfer (direct memory access DMA) between the Codec and an external circuit (usually a memory), to a direct memory access controller (DMAC). The signal a-7 is a DMA acknowledge (DACK) signal signal to acknowledge to DRQT. After the Codec has sent out the DRQT signal, it waits for the DACK signal, and after it has received the DACK signal, it inputs and outputs the data in synchronism with the DS signal. The signal a-8 is an interrupt request (IRQ) signal to the microcomputer. It is used, for example, when one line of processing has been completed. The signal a-9 is a reset signal to initialize the Codec. The signal a-10 is a clock (CLK) signal which is a timing source in the Codec. Since the interface to the microcomputer by those signals is known by an LSI which is commercially available and directly coupled to the microcomputer, a further explanation is omitted here. Since the Codec has the MPU I/F 2100 and can be directly coupled to the bus of the microcomputer, a system configuration is easy and the size is reduced.

A control unit 2200 supplies timing signals to the hardwares in the Codec through an internal control bus b and checks status of the hardwares to determine the next action. It primarily consists of microprograms. It will be further explained with reference to FIG. 3.

An execution unit (EXU) 2300 includes an ALU and registers and calculates a run length (RL) and a relative difference between the transition points on the reference line and the encoding line based on the transition point addresses, and also carries out the reverse operation. It will be further explained with reference to FIG. 4.

A video address (VA) generator 2400 generates the video address signal a-10 to a video memory (VM) which stores the video signal. It will be further explained with reference to FIG. 5.

A table unit 2500 comprises MH code/MR code encoding table and decoding table. It converts the video signal to the MH code or MR code based on the RL and the relative difference supplied from the EXU 2300 and a mode signal supplied from the control unit 2200, and also carries out the reverse operation. It will be further explained with reference to FIGS. 7 and 8 and Tables 1–3.

A transition point detector 2600 reads in the video signal, word by word, from a memory which stores the video signals of the reference line and the encoding line, word by word, and parallelly detects the transition points in the word (called a bit address). It will be further explained with reference to FIGS. 9 and 10 and Table 4.

A video signal generator 2700 parallelly reproducing the video signal, word by word, based on the bit addresses of the two adjacent transition points on the decoding line, information on a difference between the word addresses of the two transition points and color information on the video signal between the transition points. It will be further explained with reference to FIGS. 11 and 12 and Table 5.

A video bus interface (VBUS I/F) 2800 inputs and outputs an interface signal to the VM which stores the video signal, a signal to control a video bus (V bus) and a signal to transfer the video signal from an external device by the DMA. A signal d-1 is a video bus request (BRQT) signal to request a right to use the V bus when the Codec uses the V bus. It is issued when the unit other than the Codec has a right to use the V bus. A signal d-2 is a video bus acknowledge (BACK) signal to acknowledge the BRQT signal d-1. A signal d-3 is a video bus enable (VBE) signal to indicate the use of the V bus by the Codec. A signal d-4 is a video data strobe (VDS) signal to indicate a timing for the transfer of the video signal between the Codec and an external unit (usually the memory). The signal d-5 is a video bus read/write (V R/W) signal to inform the data transfer from the Codec to the external unit or vice versa when the data is transferred between the Codec and the external unit. A signal d-6 is a transport data DMA request (TDRQT) to request the data transfer of the video signal from a video signal generator (usually a scanner of the facsimile) to the VM. A signal d-7 is a transport data DMA acknowledge (TDACK) signal to acknowledge the TDRQT signal. A signal d-8 is a receive data DMA request (RDRQT) signal to request the data transfer of the video signal from the VM to the video signal receiver (usually a recorder of the facsimile). A signal d-9 is a RDRQT acknowledge (RDACK) signal to acknowledge the RDRQT signal. A signal d-10 is a VA signal to the VM from the Codec. (VA stands for a word address.). A signal d-11 is a video data bus (VD bus) signal to transfer the video signal word by word.

FIG. 3 shows a detail of the control unit 2200 an instruction register (IR) 2210 receives a macro-instruction such as an MH encoding instruction from an external unit (usually a microcomputer). A mapping ROM 2200 generates a start address of a ROM 2240 which stores a microprogram to be executed, based on the macro-instruction stored in the IR 2210. A sequencer 2230 generates an address of the microprogram ROM 2240 to control interruption, and subroutine and generate a jump address. A pipeline register 2250 stores a micro-instruction from the microprogram ROM 2240. An output of the pipeline register 2250 is supplied to the hardware as an operation command through an internal control bus b. A portion of the output is fed back to the sequence 2220 to control the sequencer 2200 such as interrupt enable/disable. A status register 2260 stores an internal status of the Codec. It informs the end of processing or a ready status of a data buffer register (DBR) 2280 to the microcomputer. A system control register (SCR) 2270 stores a signal to control the system of the Codec which signal is issued by the microcomputer. For example, it indicates whether the Codec occupies the V bus or not and specifies a line-by-line processing or a multi-line (page mode) processing. A multiplexor (MPX) 2290 connects a portion of an external control bus c to the internal control bus b when the Codec is idling or waiting and connects the signal from the pipeline register 2250 to the internal control bus b when the Codec is in other state. Thus, the microcomputer can access the register in the Codec controller by the internal control bus b. A DBR 2280 transfers data between the VD bus (signal d-11) and the D bus (signal a-5). When the microcomputer sets at the IR 2210 a data transfer command for the transfer of data between the system bus (S bus) and the V bus, for example the data transfer from the V bus to the S bus. VS is set in the DBR 2280 and a DBR ready flag of the SR 2260 is set. The microcomputer then reads the DBR 2280 to obtain VS. A similar operation is carried out when the direction of data transfer is opposite. This operation will be further explained later.

Since the control unit 2200 uses the microprogramming control scheme, it can offer flexible processing, and since the timing is centrally controlled by the control unit 2200, a design of an LSI chip is facilitated.

FIG. 4 shows a detail of the EXU 2300. A register file 2310 may be a 2-port random access memory which stores various signals. Let us assume that one word is equal to one byte. The register file 2310 comprises a virtual address register A channel (VARA) which stores an address of an encoding line in the encoding mode or of a decoding line in the decoding mode, a virtual address register B channel (VARB) which stores an address of a reference line, a virtual address register C channel (VARC) which stores an address of a line (transfer line) when the video signal is transferred by DMA between the scanner or the recorder and the VM, a temporary address register A (TARA) which stores a position of a transition point in the encoding line or the decoding line, and a temporary address register B (TARB) which stores an address of a transition point in the reference line. The addresses stored in those registers are virtual addresses with start points of the lines being virtually address zero. They stores both word addresses and bit addresses. The virtual addresses are used throughout the EXU 2300. By the use of the virtual addresses, a relative address difference between the transition point in the reference line and the transition point in the encoding line can be obtained at a high speed. Since only a memory capacity to store the address regions in only the horizontal direction is required, the register file may be of small size and the ALU 2350 may also be of small scale. Since the bit addresses are stored in the registers, the distance between the transition points can be obtained by bit at a high speed. The register file 2310 further includes a terminal register A, B channel (TRAB) and a terminal register C channel (TRC) which stores the number of pixels in one line, a horizontal width register (HWR) which stores the number of pixels in a horizontal line of a screen, a line number register (LNR) which stores a line number to be processed, a minimum code length register (MCLR) which stores the minimum number of code bits in one line, and general register A (GRA) and a general register B (GRB) which are working registers of the Codec. A detail of the use of those registers will be explained later in connection with microprogram flows. An A latch 2320 and a B latch 2330 latch outputs from an A port and a B port of the register file 2310, respectively. An A mask 2341 and a B mask 2342 control masking or unmasking of the bit addresses of the outputs of the A latch 2320 and the B latch 2330, respectively. An MPX 2344 selects the output of the A latch 2320 or an output of a table unit 2500 as an input to the A port of the ALU 2350. An MPX 2343 selects the output of the B latch 2330 or "8" as an input to the B port of the ALU 2350. The ALU 2350 calculates the data inputted to the A port and the B port and produces an operation result, it or example A-B. An ALUSR 2360 stores a status of the operation result of the ALU 2350, for example, a zero flag, an overflow flag or an underflow flag. A comparator 2370 compares the output of the ALU 2350 with the output of the B latch 2330. For example, the content of the VARA is latched in the A latch 2320, the content of the TRAB is latched in the B latch 2330, the output of the A latch 2320 masked by the A mask 2341 is applied to the A port of the ALU 2350, "8" is applied to the B port of the ALU 2350 and an operation of (A port + B port) is carried out to increment the word address of the VARA. It is compared with the content of the TRAB to determine a line end. An MPX 2381 selects the output of the ALU 2350 or the transition point bit address from the transition point detector 2600 as low order three bits of a write data to the register file 2310. Thus, the transition point bit address can be stored in the register file 2310 at a high speed. An MPX 2382 selects the data on the D bus or the output of the ALU 2350 as a write data to the register file 2310. Thus, the TRAB, TRC, HWR, LNR and MCLR can be set directly from the microcomputer as parameters. As a result, the Codec can provide flexi ble processing. For example, when the content of th TRAB is set to be smaller than the content of the TRC a portion of the video signal from the scanner can b encoded. This will be further explained in connectio with the microprogram flow.

FIG. 5 shows a detail of the video address generato 2400. A register file 2410 comprises a start address regis ter A (SARA) which stores a real word address of th VM at a start point of the encoding or decoding line, start address register B (SARB) which stores a rea word address of the VM at a start point of the referenc line and a start address register C (SARC) which store a real word address of the VM at a start point of transfer line. An adder 2420 sums a start address of line in the register file and a virtual word address fron the EXU 2300 to generate a real word address of th VM (video address). The video address is latched in a address latch 2340 and thence outputted to the VA bus Any video address can be generated by the start addres and the virtual address. An MPX 2450 selects the signa d-11 on the VA bus or the signal a-5 on the D bus as write data to the register file 2410. In a mode (called line mode) in which the control is shifted to the mi crocomputer at each end of one line of processing, th start address is directly set by the microcomputer fo each line. In a mode (called a page mode) in which number of lines set in the LNR are continuously pro cessed, the start address is set by the microcomputer a the beginning of the page and the Codec sums the star address in the register file 2410 and the content of th HWR in the register file 2310 and stores the sum as th next start address. In this case, since the microcompute sets the start address only once per page and the subse quent processing is carried out by the Codec, the load t the microcomputer is relieved. By setting appropriat values in the HWR, LNR, TR and SAR, any rectangu lar area in the screen can be processed by the Codec a a high speed. FIG. 6 illustrates the processing, in whicl HW denotes a horizontal width of the screen which i set in the HWR, LN denotes the number of lines to b processed which is set in the LNR, T denotes the num ber of pixels per line to be processed which is set in th TR, and SA denotes the start address of the VM at th beginning of the page which is set in the SAR. When macrocommand is issued by the microcomputer, th Codec continuously processes the hatched area of FIG 6.

FIG. 7 shows a detail of the encoding table unit of th table unit 2500. A latch 2501 latches an operation resul of the ALU 2350. A mode discriminator 2502 discrimi nates a mode in the encoding operation (for exampl whether RL is no smaller or smaller than 64 in the MF encoding operation) based on the operation result of th ALU 2350 and informs the discrimination result to th sequencer 2230. An address generator 2503 generates a address to an encoding table ROM 2504 based on th signal from the internal control bus and the operatio result of the ALU latched in the latch 2501. The outpu of the encoding table ROM 2504 is loaded to a shif register 2505, the content of which is shifted bit by bi and sequentially transferred to a serial/parallel (S/P converter 2507. When eight bits have been transferre to the S/p converter 2507, they are written into a first-i first-out (FIFO) memory 2508. The transfer of the eigh bits of the code to the S/P converter 2507 is counted b the GRB of the EXU 2300 and the ALU 2350. Since i is counted by the ALU and the register without counter, the timing can be centrally controlled and the timing control is facilitated. A terminate detector 2506 detects an end of the code loaded to the shift register 2505. It will be further explained later. The FIFO memory 2508 serves to enhance a code transfer efficiency. When the code is set in the FIFO memory 2508, a signal DRQT is outputted through the external control bus. When the DMAC is connected, the FIFO memory 2508 is accessed by the DACK. When the DMAC is not connected, the microcomputer directly reads the FIFO memory 2508 to obtain the code. Since the code is directly outputted to the D bus, the system design is facilitated. Since the code is parallelly transferred, the timing control is facilitated.

pulse is applied to the shift register 2505, "0" is filled in the least significant bit position. For each shift, the most significant bit of the shift register 2505 is shifted to the S/P converter 2507. After four shifts, the content is $(10000000000000)_2$. When this pattern is supplied to the terminate detector 2506, the termination is detected and it is informed to the sequencer. The number of times of the shift is counted by the GRA of the EXU 2300 so that it is stored in the GRA at the end of one line of encoding. The total number of bits in one line is compared with the number of bits in a minimum code in the MCLR to control the number of fill codes.

FIG. 8 shows a detail of the decoding table unit, a FIFO 2510 denotes a code receiving buffer. A parallel/-

TABLE 1

| Address | | | | | | | | | Data |
|---|---|---|---|---|---|---|---|---|---|
| $A_8$ | $A_7$ | $A_6$ | $A_5$ | $A_4$ | $A_3$ | $A_2$ | $A_1$ | $A_0$ | $D_{13}$ $D_{12}$ $D_{11}$ $D_{10}$ $D_9$ $D_8$ $D_7$ $D_6$ $D_5$ $D_4$ $D_3$ $D_2$ $D_1$ $D_0$ |
| 0 | 0 | 0 | $2^5$ | $2^4$ | $2^3$ RL | $2^2$ | $2^1$ | $2^0$ | Terminating Code for white in MH code |
| 0 | 0 | 1 | $2^{11}$ | $2^{10}$ | $2^9$ RL | $2^8$ | $2^7$ | $2^6$ | Make up Code for white in MH code |
| 0 | 1 | 0 | $2^5$ | $2^4$ | $2^3$ RL | $2^2$ | $2^1$ | $2^0$ | Terminating Code for black in MH code |
| 0 | 1 | 1 | $2^{11}$ | $2^{10}$ | $2^9$ RL | $2^8$ | $2^7$ | $2^6$ | Make up code for black in MH code |
| 1 | 0 | 0 | 0 | 0 | 0 | 0 | 0 | 0 | VO Code for MR code |
| 1 | 0 | 0 | 0 | 0 | 0 | 1 | $2^1$ Difference | $2^0$ | VL(1)–VL(3) codes for MR code |
| 1 | 0 | 0 | 0 | 0 | 1 | 0 | $2^1$ Difference | $2^0$ | VR(1)–VR(3) codes for MR code |
| 1 | 0 | 0 | 0 | 0 | 1 | 1 | 0 | 0 | P mode code for MR code |
| 1 | 0 | 0 | 0 | 0 | 1 | 1 | 0 | 1 | H mode code for MR code |
| 1 | 0 | 0 | 0 | 0 | 1 | 1 | 1 | 0 | EOL |
| 1 | 0 | 0 | 0 | 0 | 1 | 1 | 1 | 1 | EOL + 1 |
| 1 | 0 | 0 | 0 | 1 | 0 | 0 | 0 | 0 | EOL + 0 |

Table 1 explains the encoding table ROM 2504. The RL and the difference in the column of address use the operation result of the ALU 2350 as the address. Other portions are generated by the address generator 2503 based on the signal from the internal control bus. Since the operation result of the ALU 2350 is directly used as the table address, the encoding table can be looked up quickly.

serial (P/S) converter 2511 supplies the code received 8-bit parallelly to an end of line (EOL) detector 2512 and an address generator 2513, bit serially. A counter function necessary to the P/S converter 2511 is carried out by the GRB of the EXU 2300. Thus, a counter which requires its own timing is not necessary. The EOL detector 2512 comprises a 12-bit S/P converter and a gate which detects whether the output of the S/P

TABLE 2

| Address | | | | | | | | | Data | | | | | | | | | | | | | |
|---|---|---|---|---|---|---|---|---|---|---|---|---|---|---|---|---|---|---|---|---|---|---|
| $A_8$ | $A_7$ | $A_6$ | $A_5$ | $A_4$ | $A_3$ | $A_2$ | $A_1$ | $A_0$ | $D_{13}$ | $D_{12}$ | $D_{11}$ | $D_{10}$ | $D_9$ | $D_8$ | $D_7$ | $D_6$ | $D_5$ | $D_4$ | $D_3$ | $D_2$ | $D_1$ | $D_0$ | |
| 0 | 0 | 0 | 0 | 0 | 0 | 1 | 0 | 0 | 1 | 0 | 1 | 1 | 1 | 0 | 0 | 0 | 0 | 0 | 0 | 0 | 0 | 0 | ←MH code White RL = 4 |

| Number of Times of Shift | Output of shift register | | | | | | | | | | | | | | |
|---|---|---|---|---|---|---|---|---|---|---|---|---|---|---|---|
| | $D_{13}$ | $D_{12}$ | $D_{11}$ | $D_{10}$ | $D_9$ | $D_8$ | $D_7$ | $D_6$ | $D_5$ | $D_4$ | $D_3$ | $D_2$ | $D_1$ | $D_0$ | |
| 0 | 1 | 0 | 1 | 1 | 1 | 0 | 0 | 0 | 0 | 0 | 0 | 0 | 0 | 0 | |
| 1 | 0 | 1 | 1 | 1 | 0 | 0 | 0 | 0 | 0 | 0 | 0 | 0 | 0 | 0 | |
| 2 | 1 | 1 | 1 | 0 | 0 | 0 | 0 | 0 | 0 | 0 | 0 | 0 | 0 | 0 | |
| 3 | 1 | 1 | 0 | 0 | 0 | 0 | 0 | 0 | 0 | 0 | 0 | 0 | 0 | 0 | |
| 4 | 1 | 0 | 0 | 0 | 0 | 0 | 0 | 0 | 0 | 0 | 0 | 0 | 0 | 0 | ←Detection of Terminate |

Table 2 explains a method for encoding an MH code "1011" having an RL of 4 by using the table, sending the code to the S/P converter 2507 and detecting the termination of the code by the terminate detector 2506. When the operation result of the ALU 2350 indicates that a white RL is 4 ($=(100)_2$), an address of the table in $(000000100)_2$. In the table 2504, a data $(10111000000000)_2$ is stored, starting from the high order bit. The high order four bits represent the code, and "1" at the bit $D_9$ indicates the end of the code. This value is loaded in the shift register 2505. When a shift converter is equal to $(000000000001)_2$ to determine if the received code pattern is the EOL or not. By providing the independent EOL detector 2512, the EOL can be positively and quickly detected even if a transmission error occurs and a disconnection of the code word is erroneously detected. An address generator 2513 generates an address for a decoding table ROM 2514. It generates a start address of the decoding table ROM 2514 and a next address based on the received code and the output of the decoding table ROM 2514. The decoding scheme uses a tree search system which is described in Japanese Patent Application No. 55-174592 and briefly explained here with reference to Table 3. A latch 2515 temporarily stores the output of the decoding table ROM 2514.

TABLE 3

| Address | | | | | | | | | | Data | | | | | | | | |
|---|---|---|---|---|---|---|---|---|---|---|---|---|---|---|---|---|---|---|
| $A_9$ | $A_8$ | $A_7$ | $A_6$ | $A_5$ | $A_4$ | $A_3$ | $A_2$ | $A_1$ | $A_0$ | $D_7$ | $D_6$ | $D_5$ | $D_4$ | $D_3$ | $D_2$ | $D_1$ | $D_0$ | Remarks |
| 0 | 0 | | | | | | | | Received Code | $A_7$ | $A_6$ | $A_5$ | $A_4$ | $A_3$ | $A_2$ | $A_1$ | 0 | Decoding of MH white code not completed. |
| | | | Output from table | | | | | | | | | Next Table Address | | | | | | |
| | | | | | | | | | | 0 | $2^5$ | $2^4$ | $2^3$ | $2^2$ | $2^1$ | $2^0$ | 1 | Decoding of MH white terminating code completed |
| | | | | | | | | | | | | | RL | | | | | |
| | | | | | | | | | | 1 | $2^{11}$ | $2^{10}$ | $2^9$ | $2^8$ | $2^7$ | $2^6$ | 1 | Decoding of MH white make-up code completed. |
| | | | | | | | | | | | | | RL | | | | | |
| 0 | 1 | | | | | | | | Received code | $A^7$ | $A_6$ | $A_5$ | $A_4$ | $A^3$ | $A^2$ | $A^1$ | 0 | Decoding of MH black code not completed |
| | | | Output from table | | | | | | | | | Next Table Address | | | | | | |
| | | | | | | | | | | 0 | $2^5$ | $2^4$ | $2^3$ | $2^2$ | $2^1$ | $2^0$ | 1 | Decoding of MH black terminating code completed |
| | | | | | | | | | | | | | RL | | | | | |
| | | | | | | | | | | 1 | $2^{11}$ | $2^{10}$ | $2^9$ | $2^8$ | $2^7$ | $2^6$ | 1 | Recording of black make-up code completed. |
| 1 | 0 | | | | | | | | Received code | $A^7$ | $A_6$ | $A^5$ | $A_4$ | $A_3$ | $A_2$ | $A_1$ | 0 | Decoding of MR code not completed. |
| | | | Outut from table | | | | | | | 0 | 0 | 0 | 0 | 0 | 0 | 0 | 0 | Decoding of VO code completed. |
| | | | | | | | | | | 0 | 0 | 0 | 0 | 1 | $2^1$ | $2^0$ | 1 | Decoding of VL(1)-VL(3)completed. |
| | | | | | | | | | | | | | | Difference | | | | |
| | | | | | | | | | | 0 | 0 | 0 | 1 | 0 | $2^1$ | $2^0$ | 1 | Decoding of VR(1)-VR(3)completed. |
| | | | | | | | | | | 0 | 0 | 0 | 1 | 1 | 0 | 0 | 1 | Decoding of P completed |
| | | | | | | | | | | 0 | 0 | 0 | 1 | 0 | 0 | 1 | 1 | Decoding of H completed |

Table 3 explains the decoding table ROM 2514. It is constructed to decode in a tree search system. The decoding table ROM 2514 has its addresses divided into three portions, MH white code portion, MH black code portion and MR code portion. The content of the decoding table ROM 2514 is a portion of the address of the decoding table ROM 2514 to be next accessed when the decoding is not completed or at an intermediate point of the code word, and it is information of the code when the code word is terminated and the decoding is completed. The sequencer 2230 looks up the decoding table ROM 2514 once per code bit to determine the meaning of the decoded code based on the output of the ROM 2514. Since the information of the decoded code is applied directly to the A port of the ALU 2350 through the MPX 2344, the position of the transition point can be quickly determined.

FIG. 9 shows a detail of the transition point detector 2600 which comprises a reference line transition point detector 2610 and an encoding line transition point detector 2620. Since the operations of those detectors are essentially identical, the reference line transition point detector 2610 is explained. An MPX 2614 selects one of the data VS from the VD bus, the data $\overline{VS}$ which is an inversion of the data on the VD bus and the data from the latch 2617. A mask circuit 2616 functions to change bits of the data supplied from the MPX 2614 to "1's" up to a bit position specified by the bit address BA. It will be explained in detail with reference to FIG. 10. A latch 2617 temporarily stores the output of the mask circuit 2616. A priority encoder 2618 detects a position of the least significant "0" in the input data. When "0" exists in the data, a reference line transition point flag is set to "1" to inform the presence of the transition point to the sequencer 2230. The position of "0" is outputted to the EXU 2300 as a transition point bit address. Since the bit address is inputted directly to the register file 2310, the bit address of the transition point can be quickly stored. The transition point bit address is outputted to the mask circuit 2616 through an MPX 2619 as the bit address BA. The MPX 2619 selects the B port bit address from the B latch 2330 of the EXU 2300 or the transition point bit address from the priority encoder 2618. The B port bit address is selected only when a start bit address for the detector of the reference line transition point is to be set to a bit address of the encoding line transition point (this being called a reference line address return). This will be further explained with reference to the microprogram flow. An exclusive OR (EXOR) 2611 receives a color signal of the start point of encoding ($a_0$) and a signal $\overline{b_1}/b_2$ which selects whether the reference line transition point $b_1$ or $b_2$ is to be selected, where $b_1$ is the transition point for the opposite color to $a_0$ on the right of a point immediately above $a_0$, and $b_2$ is the transition point for the same color as $a_0$ on the right of $b_1$, and it controls the MPX 2614. A gate 2612 causes the MPX 2614 to select the output of the latch 2617 only when the transition point flag is "1" and the reference line address return is "0". An OR gate 2613 enables the mask circuit 2616 when the transition point flag is "1" or the address return is "1". FIG. 10 shows a detail of the mask circuit 2616 which comprises a decoder 2616-1 and NAND gates 2616-2–2616-8.

TABLE 4

Initial condition
VS = $(0\,0\,1\,1\,1\,0\,0\,0)_2$, $a_0$ color = "0", $\bar{b}_1/b_2$ = "0"
Transition point flag = "0", Address return = "0"

| Number of times of latching | Mask circuit input data | | | | | | | | Mask circuit output data | | | | | | | | Transition point flag | Bis address |
|---|---|---|---|---|---|---|---|---|---|---|---|---|---|---|---|---|---|---|
| | $D_7$ | $D_6$ | $D_5$ | $D_4$ | $D_3$ | $D_2$ | $D_1$ | $D_0$ | $\overline{D_7}$ | $\overline{D_6}$ | $\overline{D_5}$ | $\overline{D_4}$ | $\overline{D_3}$ | $\overline{D_2}$ | $\overline{D_1}$ | $\overline{D_0}$ | | |
| 1 | 0 | 0 | 1 | 1 | 1 | 0 | 0 | 0 | 1 | 1 | 0 | 0 | 0 | 1 | 1 | 1 | 1 | 3 |
| 2 | 1 | 1 | 0 | 0 | 0 | 1 | 1 | 1 | 0 | 0 | 1 | 1 | 1 | 1 | 1 | 1 | 1 | 6 |
| 3 | 0 | 0 | 1 | 1 | 1 | 1 | 1 | 1 | 1 | 1 | 1 | 1 | 1 | 1 | 1 | 1 | 0 | — |

Table 4 shows an example of operation of the transition point detector. As an initial condition, it is assumed that VS=$(0\,0\,1\,1\,1\,0\,0\,0)_2$, $a_0$ coder="0", $\bar{b}_1/b_2$="0", reference line transition point flag="0" and reference line address return ="0". At the first time of latching, the outputs of the EXOR 2611 and the gate 2612 are "0" because of the initial condition, and the input data to the mask circuit 2616 is VS. Since the mask circuit enable signal E is "0", the output of the mask circuit 2616 is a mere inversion of the input data. Accordingly, $(1\,1\,0\,0\,0\,1\,1\,1)_2$—is latched in the latch 2617. Thus, the priority encoder 2618 outputs the reference line transition point flag "1" and the reference line transition point bit address "3". At the second time of latching, the reference line transition point flag is "1" and the output of the gate 2612 is "1" and the input data to the mask circuit 2616 is the output data of the latch 2617 or $(1\,1\,0\,0\,0\,1\,1\,1)_2$. Since the mask circuit enable signal E is "1", the mask circuit 2616 inverts the input data and outputs the data $(0\,0\,1\,1\,1\,1\,1\,1)_2$ in which the bits are changed to "1's" up to the bit position specified by the reference line bit address. As a result, the transition point bit position "6" is obtained. The latch operation is repeated in a similar manner until the transition point no longer exists so that the transition point bit address is obtained. In this manner, the transition point detector can detect the transition point bit address at any position in the eight bits by one latching operation, and can detect the transition point faster than a method in which each bit is checked after the bits were latched. Further, since no counter is used to check the transition point bit address, the timing can be controlled by the control unit 2200 and hence the LSI design is facilitated.

FIGS. 11 and 12 and Table 5 explain a detail of the video signal generator 2700.

A video signal generating circuit 2701 receives the bit addresses at the start point and the end point of reproducing from the bit addresses of the A port and the B port of the EXU 2300, and receives a word address difference between the start point and the end point or reproducing based on the operation result of the ALU 2350 to generate a decoded data. FIG. 11 shows a detailed circuit thereof and Table 5 shows a truth table. A word address difference can be obtained by latching the address at the start point of reproducing in the A latch 2320, latching the address at the end point of decoding in the B latch 2330, activating the A mask 2341 and the B mask 2342 to supply those addresses to the ALU 2350, and carrying out an operation of (B-A) and checking the resulting difference. By providing the circuits 2342 and 2343 which mask the bit address in the EXU 2300, the presence or absence of the word address difference can be quickly determined in one arithmetic operation in spite of the fact that the bit address and the word address are stored in the file register 2310. FIG. 12 shows a detail of the video signal generating circuit 2701 which comprises circuit units 2701-1 and 2701-2 and AND gates. The operation of the circuit is shown by the truth table of Table 5.

TABLE 5

| $a_0$ color | Word difference | B | A | $D_7$ | $D_6$ | $D_5$ | $D_4$ | $D_3$ | $D_2$ | $D_1$ | $D_0$ |
|---|---|---|---|---|---|---|---|---|---|---|---|
| 0 | — | — | — | 0 | 0 | 0 | 0 | 0 | 0 | 0 | 0 |
| 1 | 0 | y | x | $D_x$ - $D_{y-1}$ are "1", others are "0". | | | | | | | |
| 1 | 1 | — | x | $D_x$ - $D_7$ are "1", others are "0". | | | | | | | |

—: either "0" or "1"

When the $a_0$ color is "0", all outputs are "0's", and when the $a_0$ color is "1" and there is no word address difference, the bits $D_x-D_{y-1}$ are "1's" and are "0's", where x in the A port bit address and y the B port bit address, and then the $a_0$ color is "1" and there is a word address difference, the bits $D_x-D_7$ are "1's" and others are "0's". In this manner, the reproduced video signal in the word can be generated in one operation. It is faster than a method in which the signal is generated bit by bit by using a counter, and easy to control the timing. A temporary register 2702 stores the decoded video signal in an immediately previous cycle and it is cleared when one word of decoded video signal is written into the memory. An OR circuit 2703 OR's the output of the video signal generating circuit 2701 and the output of the temporary register 2702 so that the video signal in one word is successively reproduced. A latch circuit 2704 latches one word of reproduced video signal and outputs the reproduced video signal to the VD bus. The reproduced video signal is written into the VM one word at a time. In this manner, the video signal generator 2700 reproduces the video signal fully parallelly so that the video signal is reproduced quickly.

The hardware configuration and the operation of the Codec have been explained with reference to FIGS. 2 to 12 and Tables 1 to 5. The operations of the Codec in various processing modes will now be explained with reference to status transition charts shown in FIGS. 13 to 15.

FIG. 13 shows the status transition chart in the encoding and decoding mode. $S_I$ indicates an idling status. In the $S_I$ status, when a microcommand (e.g. an MH encoding command) is issued after setting of an appropriate parameter from the microcomputer, the status transits to $S_I$ in which one line of given processing is executed. A detail of the operation in this state will be explained with reference to the microprogram flow. The processing in the $S_I$ status is continuously executed until one line of processing is completed, when an end of processing flag is set if a page mode is not set, and the status returns to $S_1$. If the page mode is set, the status shifts to $S_2$ in which the content of the SAR and the content of the HWR are added and the sum is stored in the SAR to update the start address and the LNR is decremented to determine the page end. If the content of the LNR is not zero, it is determined that it is not the page end and the status returns to $S_1$. If it is the page end, the status returns to $S_I$. Since the microcomputer needs only issue one microcommand per line or page, the load to the microcomputer is relieved.

FIG. 14 shows the status transition chart in a line mode when a VM read microcommand is issued. This command is issued when the system bus of the microcomputer is isolated from the video bus and the microcomputer accesses the VM on the video bus. The status $S_I$ is the idling status. If an appropriate parameter is set from the microcomputer and the VM read command is issued, the status shifts to $S_1$. In the status $S_1$, if the Codec has an exclusive right to occupy the V bus, the status immediately shifts to $S_2$. If the Codec does not have the exclusive right to occupy the V bus, the BRQT signal is issued and when the BACK signal is sent back, the status shifts to $S_2$. In the status $S_2$, the content of the SAR and the content of the VAR are added and the same is outputted as the video address. The VR/$\overline{W}$ and the VDS are outputted and the VS from the VM is latched in the DBR, and the DBR ready flag is set, the BRQT is released and the status shifts to $S_3$. In the status $S_3$, the reading of the DBR by the microcomputer or the input of the DACK signal from the DMAC is checked. If the DBR is accessed, the DBR ready flag is reset and the VAR is incremented. If the line end is detected, the status shifts to $S_I$, and if the line end is not detected, the status shifts to $S_1$. In this manner, the microcomputer can access the memory on the V bus through the DBR. Since the video address is generated by the Codec, the microcomputer having a small address space can access a large memory. Since the video address is automatically incremented by the Codec, the VM can be quickly accessed.

FIG. 15 shows the status transition chart when the data is transferred between the scanner or the recorder and the VM. The data transfer is executed not by the microcommand from the microcomputer but by the TDRQT or the RDRQT from the scanner or the recorder. Since those signals are applied to the sequencer 2230 as an interrupt signal, the data can be transferred during the execution of the operation shown in FIGS. 19 or 20. In the status $S_I$, the end of transfer flag is in a set state. If the start address of the VM is set to the SARC from the microcomputer, the status shifts to $S_1$. In the status $S_1$, the TDRQT or the RDRQT is acceptable. If the TDRQT or RDRQT signal is issued in the status $S_1$, the status shifts to $S_2$. In the status $S_2$, if the Codec has the exclusive right to occupy the V bus, it has no sense and the status immediately shifts to $S_3$. If the Codec does not have the exclusive right, the BRQT signal is issued in the status $S_2$ and when the BACK signal is sent back, the status shifts to $S_3$. In the status $S_3$, the TDACK signal or the RDACK signal is issued to inform the start of the data transfer to the scanner or the recorder, and the status shifts to $S_4$. In the status $S_4$, the video address, the VR/$\overline{W}$ and the VDS are outputted, the VD is transferred and then the BRQT is released and the status shifts to $S_5$. In the status $S_5$, the VRAC is incremented. If the line end is not detected, the status returns to $S_1$. If the line end is detected and it is not in the page mode, the end of transfer flag is set and the status returns to $S_I$. If the line end is detected and it is in the page mode, the status shifts to $S_6$. In the status $S_6$, the start address is updated and the LNR is decremented. If the page and is not detected, the status shifts to $S_1$. If the page end is detected, the end of transfer flag is set and the status returns to $S_I$. As described above, since the data can be transferred during the encoding operation, a high speed processing is attained. Since the data transfer is effected fully parallelly, the data can be transferred fastly with a low speed memory.

The internal operation of the Codec is now explained in further detail with reference to the microprogram flow for the MR encoding and decoding operations. The MR code system is first briefly explained with reference to FIG. 16.

FIG. 16 explains the MR code system, in which FIG. 16(a) explains a definition of the transition point. It shows states of pixels in the reference line and the encoding line. Hatched pixels represent black pixels, and $a_0$ represents the start point of encoding, $a_1$ and $a_2$ represent the transition points in the encoding line, $b_0$ represents a point in the reference line located immediately above $a_0$, $b_0$ represents a first transition point in the reference line for the opposite color to $a_1$, located on the right of $b_0$, and $b_2$ represents a first transition point in the reference line for the same color as $a_0$, located on the right of $b_1$. The MR code is categorized into a pass mode (P mode), a vertical mode (V mode) and a horizontal mode (H mode). FIG. 16(b) shows the P mode. In the P mode, $b_1$ and $b_2$ appear before $a_1$ appears. In the P mode encoding, a new $a_0$ is set immediately below $b_2$.

FIG. 16(c) shows the V mode. In the V mode, the requirement of the P mode is not met and an absolute value of distance between $a_1$ and $b_1$ (called a relative address difference or difference) is no larger than three. When the difference between $a_1$ and $b_1$ is "0", it is a V(0) code, when $a_1$ is on the left of $b_1$, it is a VL (difference) code, and when $a_1$ is on the right of $b_1$, it is a VR (difference) code. In the illustrated example, it is encoded as VR(2). After the encoding, $a_1$ is set as a new $a_0$.

FIG. 16(d) shows the H mode. When the requirement of the P mode is not met and the difference between $a_1$ and $b_1$ exceeds three, the H code is outputted and the RL between $a_0$ and $a_1$ is MH encoded, and then the RL between $a_1$ and $a_2$ is MH encoded. After encoding, $a_2$ is set as a new $a_0$.

TABLE 6

| Register | Function |
|---|---|
| VARA | Current scan address ($a_0$ - $a_2$) of encoding line |
| VARB | Current scan address ($b_0$ - $b_2$) of reference line |
| TARA | Address of $a_0$ or $a_1$ of encoding line |
| TARB | Address of $b_1$ of reference line |
| GRA | Number of bits of one line of code |
| GRB | 8-bit counter |
| SARA | Start address of encoding line (word by word) |
| SARB | Start address of reference line (word by word) |
| TRAB | Number of pixels in one line (word by word) |

Table 6 shows functions of the registers in the MR encoding. The VARA stores the virtual word address and the bit address of the encoding line under scan. The VARB stores the virtual word address and the bit address of the reference line under scan. The TARA stores the virtual word address and the bit address of $a_0$ or $a_1$. The TARB stores the virtual word address and the bit address of $b_1$. The GRA stores the number of code bits in one line. The GRB stores the 8-bit of the S/P converter 2507. The SARA stores the real word address at the start point of scan of the VM which stores the data of the encoding line. The SARB stores the real word address at the start point of scan of the VM which stores the data of the reference line.

FIGS. 17 to 22 show a portion of the microprogram flow in the MR encoding. It is assumed that the Codec has the exclusive right to occupy the V bus. When the Codec receives the MR encoding macro-command from the microcomputer at the IR 2210, the sequencer 2230 outputs an address to execute a step 6101 to start the MR encoding. The microprogram ROM 2240 outputs a bit pattern of the microprogram for executing the step 6101, specified by the sequencer 2230 to the pipeline register 2250 so that the processing is started. The step 6101 is an initialization step in which the output of the ALU 2350 is reset to zero and it is written into the VARA to clear the VARA, and the $a_0$ color is set to white. In a step 6102, a $b_1$ detection mode is set. It means that the signal $\bar{b}_1/b_2$ to the EXOR 2611 is set to "0" (white="0"). In a step 6103, the VARB is latched in the A latch 2320, the output of the A latch 2320 of the SARB is added thereto and the sum is latched in the address latch 2430, which is outputted to the VA bus to change the VR/$\overline{W}$ signal to the read signal, and the VDS is outputted to access the VM and the VS is latched in the latch 2617. This sequence of operation is called VS input of the reference line. Similarly, in a step 6104, the VS of the encoding line is received and latched in the latch 2624. In a decision step 6105, the presence or absence of the transition point is checked. If the transition point exists in the input VS, the priority encoders 2618 and 2625 inform it to the sequencer. Thus, the sequencer determines the presence or absence of the transition point and can jump to a processing block. If the transition point does not exist, the process goes to a step 6106. In the step 6106, the byte addresses of the VARA and the VARB are incremented. For the VARA, it is latched in the A latch 2320, the A mask 2341 is activated and the output thereof is applied to the A port of the ALU 2350, "8" is applied to the B port, the operation (A+B) is executed and the output of the ALU 2360 is written into the VARA. As a result, the byte address of the VARA is incremented and the bit address of the VARA is cleared. When the VARA is latched in the A latch 2320, the TRAB is also latched in the B latch 2330 so that the line end can be determined by the comparator 2370 when the VARA is incremented. The VARB is incremented in the same manner. In a decision step 6107, the line end is checked, and if it is not the line end, that is, if the line end flag of the comparator is not "1", the sequencer outputs the address of the step 6103 so that the process returns to the step 6103 and the above processing is repeated. If the line end is detected, a V(0) code output subroutine is called in a step 6108 and the line end processing is started. The line end processing includes fill control which is not explained here. If the transition point exists in only the encoding line, the process jumps to a step 6201, if the transition point exists in only the reference line, the process jumps to a step 6301, and if the transition points exist in both lines, the process jumps to a step 6401. Since the video address of the encoding line and the video address of the reference line are alternately outputted for scan, even if the encoding line and the reference line coexist in the same VM, they are scanned as if the encoding line and the reference line are simultaneously scanned at the same relative position. If the transition point of the reference line should be detected after the detection of the transition point of the encoding line, the encoding in the pass mode would be delayed. If the transition point of the encoding line should be detected after the detection of the transition point of the reference line and $b_1$ is distant from $a_1$ on the right of $a_1$, the encoding would be delayed.

In the step 6201, the bit address of the transition point of the encoding line is stored. It is realized by latching the content of the VARA in the A latch 2320, supplying it to the A port of the ALU 2350 to carry out the operation (A+O), controlling the MPX 2381 such that the bit address of the transition point of the encoding line from the transition point detector 2600 is applied to the low order three bits of the file register 2310 and writing it into the VARA. Thus, only the bit address of the VARA is used as the bit address of the transition point of the encoding line and the position of $a_1$ is stored in the VARA without changing the word address. In a step 6202, the word address of the VARB is incremented. In a decision step 6203, the reference line is checked to determine if it is the line end or not. If it is the line end, the process goes to a step 6207 where the incremented value is stored in the TARB as $b_1$. If it is not the line end, the process goes to a step 6204 where the VS of the reference line is inputted. In a decision step 6205, the presence or absence of $b_1$ in the reference line is checked. If the transition point does not exist, it means that the difference between $a_1$ and $b_1$ is eight or more, and the H encoding is started. Since the encoding line and the reference line are scanned parallelly, the H mode can be determined before the transition point of the reference line is detected. If the transition point exists, the process goes to a step 6206 where the position of $b_1$ is stored in the TARB. It is readized in the same manner as that in which $a_1$ is stored in the VARA. In a step 6208, an operation ($b_1-a_1$=difference) is carried out. It is realized by latching the VARA in the A latch 2320, latching the TARB in the B latch 2330, deactivating the mask and applying the outputs of those latches to the A and B ports of the ALU 2350 to carry out an operation (B - A). The output of the ALU 2350 is latched in the latch 2501 and whether the difference is equal to or smaller than three or not is checked by the mode discriminator 2502. If the difference is equal to or smaller than three, the VL encoding is started and if the difference is larger than three, the H encoding is stored.

If the transition point exists in only the reference line in a decision step 6105, the process goes to a step 6301. In the step 6301, $b_1$ is stored in the TARB. In a step 6302, a $b_2$ detection mode is set. In a step 6303, a latch pulse is applied to the latch 2617 of the reference line transition point detector 2610 to detect if $b_2$ exists in addition to $b_1$ in the VS of the reference line inputted in the step 6103. This operation is called interbyte transition point detection. This operation was explained in detail with reference to FIG. 9. In a decision step 6304, the presence or absence of $b_2$ is checked. If $b_2$ exists, it means that both $b_1$ and $b_2$ exist before $a_1$, and the P encoding is started. If $b_2$ does not exist, the process goes to a step 6305. In the steps 6305 and 6306, the byte addresses of the VARB and the VARA are incremented. In a decision step 6307, the line end is checked, and if it is the line end, the process goes to a step 6319, and if it is not the line end, the process goes to a step 6308. In the steps 6308 and 6309, the VS of the reference line and the VS of the encoding line are applied to the transition point detector 2600 to detect $b_2$ and $a_1$. If the transition point does not exist, the process goes to a step 6305. If the transition point exists in only the reference line, it means that the transition points $b_1$ and $b_2$ exist before $a_1$, and the P encoding is started. If the transition point exists in only the encoding line, the process goes to a step 6313. In the process 6313, the bit address of $a_1$ is stored in the VARA. In a step 6314, a difference between the VARA and the TARB is calculated to obtain ($a_1-b_1$=difference). In a decision step 6315, whether the difference is no larger than three or not is checked. If the difference is no larger than three, the VR encoding is started, and if the difference is larger than three, the H encoding is started. If the transition points exist in both the reference line and the encoding line in the decision step 6310, the process goes to a step 6316. In the step 6316, $a_1$ is stored in the VARA, and $b_2$ is stored in the VARB. In a step 6317, an operation (VARB−VARA) is carried out to determine a positional relation between $a_1$ and $b_2$. If ($b_2-a_1$) is negative, that is, if the ALU 2350 underflows, it is determined that $b_2$ is located on the left of $a_1$ and the P encoding is started. If the ALU 2350 does not overflow, the process goes to a step 6314. In a decision step 6207, if the line end is detected, the process goes to a step 6319. In the step 6319, the address of the line end is regarded as the position of $a_1$ and it is stored in the VARA and an operation (VARA−TARB) is carried out to obtain ($a_1-b_1$=difference). If the difference is no larger than three, the VR code output subroutine is called in a step 6327 and the line end processing is started. If the difference is larger than three, the process goes to a step 6321. In the step 6321, the H code output subroutine is called. In a step 6322, an operation (VARA−TARA) is carried out to obtain ($a_1$-$a_0$=RL). The RL is latched in the latch 2501. In a step 6323, an MH code output subroutine is called. In a step 6324, the $a_0$ color is reversed. In a step 6325, the output of the ALU 2350 is set to zero and it is latched in the latch 2501 to produce (RL=0). In a step 6326, the MH code output subroutine is called to encode (RL=0) and then the line end processing is started. In a decision step 6105, if the transition points exist in both the encoding line and the reference line, the process goes to a step 6401. In a step 6401, $a_1$ is stored in the VARA, and in a step 6402, $b_1$ is stored in the TARB. In a step 6403, an operation (VARA−TARB) is executed to obtain ($a_1-b_1$=difference). If the difference is zero, the V(0) encoding is started. If the difference is positive, it means that $a_1$ is located on the right of $b_1$. Accordingly, it is necessary to check if $b_2$ is located before $a_1$. In a step 6407, the $b_2$ detection mode is set, and in a step 6408, the interbyte transition point of the reference line is detected. If the transition point exists, the process goes to a step 6412, and if it does not exist, the process goes to a step 6410. In the step 6412, $b_2$ is stored in the VARB. In a step 6413, the operation (VARB−VARA) is carried out to obtain ($b_2-a_1$=difference). If the difference is negative, it means that $b_2$ is located on the left of $a_1$, and the P encoding is started. If the difference is not negative, it means that $b_2$ is located behind $a_1$, and the process goes to the step 6410. In the step 6410, the requirement of the P mode is not met because $b_2$ is not located on the left of $a_1$ and the operation (VARA−TARB) is carried out to obtain ($a_1$-$b_1$=difference). If the difference is no larger than three, the VR encoding is started, and if the difference is larger than three, the H encoding is started. In a decision step 6406, if the difference is negative, it means that $b_1$ is located on the right of $a_1$, and the process goes to a step 6415. In the step 6415, the operation (TARB−VARA) is carried out to obtain ($b_1-a_1$=difference) If the difference is no larger than three, the VL encoding is started and if the difference is larger than three the H encoding is started. Thus far, the VM has been scanned to detect the transition point and determine the mode. The encoding operations in the respective modes are now explained.

The H encoding starts at a step 6501. In the step 6501 the H code output subroutine is called. In a step 6502 the operation (VARA−TARA) is carried out to obtain ($a_1-a_0$=RL) and the RL is latched in the latch 2501 of the encoding table unit 2500. In a step 6503, the MH code output subroutine is called. In a step 6504, the $a_0$ color is reversed. In a step 6505, the content of the VARA is transferred to the TARA and $a_1$ is stored in the TARA. In a step 6506, the interbyte transition point of the encoding line is detected. If the transition point exists, the process goes to a step 6513. If the transition point does not exist, the process goes to a step 6508. In the step 6508, the byte address of the VARA is incremented. If the line end is detected, the process goes to a step 6511, and if the line end is not detected, the process goes to a step 6510 where the VS of the encoding line is inputted and the presence or absence of the transition point is checked. Then the process goes to a step 6507. In the step 6511, the line end point is set to $a_2$ and the operation (VARA−TARA) is carried out to obtain ($a_2-a_1$=RL). In a step 6512, the MH code output subroutine is called to start the line end processing. In the decision step 6507, it is transition point exists, the process goes to a step 6513. In the step 6513, the bit address of the transition point of the encoding line is stored in the VARA to store the position of $a_2$. In a step 6514, the operation (VARA−TARA) is executed to obtain ($a_2-a_1$=RL). In a step 6515, the MH code output subroutine is called. In steps 6522 to 6527, the reference line and the encoding line are again scanned parallelly to determine the mode. In the step 6522, the $a_2$ color is reversed. In the step 6523, the content of the VARA is transferred to the TARA to store $a_1$ or $a_2$ as a new $a_0$. In the step 6524, the content of the TARA is transferred to the VARB to reset the scan address difference between the reference line and the encoding line so that the positions of $a_0$ and $b_0$ are coincided. In the step 6525, the $b_1$ detection mode is set. In the step 6526, the content of the TARA is latched in the B latch 2330, the content of the VARB is latched in the A latch 2320, the reference line address return of the reference line transition point detector 2610 is activated and the VS of the reference line is latched in the latch 2617. Thus, the mask circuit 2616 is activated and the input VS of the reference line is masked up to the bit address of the B latch 2330 or the bit address of $a_0$, and it is latched in the latch 2617. Thus, the transition point on the right of $b_0$ which is located immediately above $a_0$ can be detected. By the step 6526, the start addresses of scan of the reference line and the encoding line can be exactly and quickly coincided. In the step 6527, the interbyte transition point of the encoding line is detected, and in the decision step 6105, the mode is determined. The VL encoding operation is now explained. It starts at a step 6521. In the step 6521, the VL code output subroutine is called, and the process goes to the step 6522. The processing in the steps 6522 et seq has been described above.

The V(0) encoding is now explained. In a step 6541 a V(0) code output subroutine a called. In the steps 6542 et seq, a post processing to move to the mode determi nation processing is carried out. Since the scan points of the reference line and the encoding line are coincident in the V(0) code, no special step to coincide the scan points is necessary. In a step 6542, the $a_0$ color is reversed. In a step 6543, the content of the VARA is transferred to the TARA to set $a_1$ as a new $a_0$. In a step 6544, the interword transition point of the reference line is detected. In a step 6545, the interword transition point of the encoding line is detected, and the process returns to the decision step 6105 to determine the mode.

The P encoding operation is now explained. In a step 6551, the P code output subroutine is called. In a step 6552, the bit address of $b_2$ is written into the bit address field of the VARB to store the position of $b_2$ in the VARB as the position of $b_0$. In a step 6553, the content of the VARB is transferred to the TARA to coincide $a_0$ to $b_0$, and the position of $b_2$ is stored in the TARA as a now $a_0$. In a step 6555, the $b_1$ detection mode is set, in a step 6556, the interbyte transition point of the reference line is detected, and the process returns to the decision step 6105.

The encoding operations in the respective modes have thus far described. The code output subroutines for the respective modes are now explained. The codes are outputted by activating the encoding table unit 2500. Based on the output of the ALU 2350 latched in the latch 2501, that is, the RL or the difference, and the mode signal from the control unit 2200 which determines the mode, the address generator 2503 generates an address to access the encoding table ROM 2504. The V(0) code output subroutine is specifically explained here and the explanation of other subroutines is omitted.

The V(0) code out subroutine starts at a step 6601. In the step 6601, the address generator 2503 generates an address $(100000000)_2$ at which the V(0) code is stored. In a step 6602, the content of the encoding table ROM 2504 is loaded to the shift register 2505. Since the V(0) code is defined as "1", $(11000000000000)_2$ is loaded to the shift register 2505. The most significant bit is the V(0) code and the second bit "1" is used to detect the termination. In a decision step 6603, it is checked if the output of the shift register 2505 is $(10000000000000)_2$ or not so that the termination is determined by the terminate flag from the terminate detector 2506. If the termination is detected, the process is returned. If the termination is not detected, the process goes to a step 6604. In the step 6604, a shift pulse is applied to the S/P converter 2507 to shift out the most significant bit of the shift register 2505, that is, "1" in the present example, to the S/P converter 2507. In a step 6605, the GRA of the file register 2310 is latched in the A latch 2320, the A mask 2341 is deactivated and the content of the A latch 2320 is applied to the ALU 2350, an operation (A+1) is carried out by the ALU 2350 and the output of the ALU 2350 is written into the GRA to increment the GRA to count the number of code bits. In a step 6606, the content of the GRB is decremented in the same manner as the step 6605. The GRB determines whether eight code bits have been generated in the S/P converter 2507. In a decision step 6607, the content of the GRB is checked. If it is zero, it is determined that the eight code bits have been generated in the S/P converter 2507, and the process goes to a decision step 6608. In the step 6608, it is checked if the FIFO memory 2508 is ready to input or not. If it is not ready, the process waits. If it is ready, the process goes to a step 6609. In the step 6609, the 8-bit code of the S/P converter 2507 is loaded to the FIFO 2508, and in a step 6610, "8" is applied to the B port of the ALU 2350 to carry out an operation (0+B), and the output of the ALU 2350 is written into the GRB to set "8" in the GRB. In a decision step 6603, since the content of the shift register 2505 is $(10000000000000)_2$, the termination is determined and the process returns. The microprogram flow in the MR encoding operation has thus been explained.

The MR decoding operation is now explained with reference to Table 7 and FIGS. 23 to 26.

TABLE 7

| Register | Function | |
|---|---|---|
| VARA | Write address of decoded data. Corresponds to $a_0$–$a_2$. | |
| VARB | Reference line address. Corresponds to $b_0$–$b_2$. | |
| TARA | Stores address of $a_1$ or $a_2$. | |
| GRB | For 8-bit counter. | |
| SARA | Start address of decoding line. | Byte by byte |
| SARB | Start address of reference line. | Byte by byte |
| TRAB | Number of pixels in one line. | Byte by byte |

Table 7 explains the functions of the registers in the MR decoding operation. The VARA stores the virtual word and bit addresses of the write position of the VM of the decoding line for the decoded data. The VARB stores the virtual word and bit addresses of the scan position of the reference line. The TARA stores the virtual word and bit addresses of $a_1$ or $a_2$. The GRB counts the 8-bits of the P/S converter 2511. The SARA and SARB store the real word addresses of the start points of the decoding line and the reference line, respectively. The TRAB stores the number of pixels in one line (byte by byte). The VS can be transferred between the recorder and the VM in parallel to the decoding operation. The VARC, the TRC and the SARC are assigned to this purpose. The VARC stores the virtual word address of the transfer line, the TRC stores the number of pixels transferred, word by word and the SARC stores a real word address of the start point of the transfer line. By appropriately selecting the values of the SARA, the SARC, the TRAB and the TRC, any word portion of the decoded VS can be transferred to the recorder.

FIGS. 23 to 26 show a microprogram for the MR decoding operation. In steps 7102 and A, the MR code is decoded and the mode is determined. In a step 7101, initialization is carried out at the start point of the line. For example, the VARA and the VARB are cleared. In the step 7102, the address generator 2513 of the decoding table unit shown in FIG. 11 generates a start address for the MR decoding. Since the decoding table ROM 2514 is configured as shown in Table 3, "10000000" is generated at $A_9-A_1$. In a decision step 7103, the content of the GRB is checked. If it is zero, it is determined that there exists no code in the S/P converter 2511 and the process goes to a decision step 7104. If it is not zero, the process goes to a step 7107. In the step 7104, it is checked if a code exists in the FIFO 2510 or not. If the code does not exist, the process waits. It the code exists, the process goes to a step 7105. In the step 7105, the output of the FIFO 2510 is loaded to the P/S converter 2511. In a step 7106, "8" is set in the GRB in the same manner as the step 6610 to store the presence of the light code bits in the P/S converter 2511. In a step 7107, a shift pulse is applied to the P/S converter 2511 to load the code at the start position of the P/S converter 2511 to the EOL detector 2512 and the address generator 2513. In a step 7108, the GRB is decremented to store that the code of the P/S converter 2511 has been decremented by one bit. In a decision step 7109, the EOL is checked by the EOL detector 2512. The EOL detector 2512 determines if the code sequence supplied from the P/S converter 2511 is "000000000001", and it comprises the S/P converter and the gates. If the EOL is detected, the line end processing is started, and if the EOL is not detected, the process goes to a step 7110. In the step 7110, the decoding table ROM 2514 is accessed and the output thereof is latched in the latch 2515. In a decision step 7111, it is checked if the code is terminated. Since the decoding table ROM 2514 is configured as shown in Table 3, it can be determined by checking if the least significant bit of the decoding table ROM 2514 latched in the latch 2515 is "1" or "0". If the code is not terminated, the process goes to a step 7112. In the step 7112, $D_1-D_7$ of the content of the decoding table ROM 2514 latched in the latch 2515 are fed back to the address generator 2513 for use as $A_1-A_7$. Then, the process returns to the decision step 7103 and the steps shown by A are continued until the code is terminated. If the termination of the code is detected in the decision step 7111, the mode of the MR code is determined based on the content of the decoding table ROM 2514 latched in the latch 2515, and the decoding program for that mode is executed. The P decoding is first explained. In a step 7201, the VS of the reference line is inputted and the transition point $b_1$ on the right of $a_0$ is detected. This is carried out in the same manner as the step 6526. If the transition point exists, the process goes to a step 7206. If the transition point does not exist, the process goes to a step 7203. In the step 7203, the word address of the VARB is incremented. In a decision step 7204, if the incremented word address of the VARB coincides with the content of the TRAB, that is, if the line end is detected, an error processing is started. If the line end is not detected, the process goes to a step 7205. In the step 7205, the VS of the reference line is inputted, the $b_1$ is detected and the process returns to the decision step 7202. If $b_1$ is detected, the process goes to a step 7206. In the step 7206, the interword transition point $b_2$ of the reference line is detected. In a decision step 7207, if the transition point exists, the process goes to a step 7211, and if it does not exist, the process goes to a step 7208. In the step 7208, the word address of the VARB is incremented. In a decision step 7209, the line end is checked. If the line end is detected, the error processing is started, and if the line end is not detected, the process goes to a step 7210. In the step 7210, the VS of the reference line is inputted, the $b_2$ is detected and the process goes to the decision step 7207. In a step 7211, the word address of the VARB and the bit address of the transition point of the reference line are written into the TARA. In a step 7212, the video signal reproducing subroutine is called and the process returns to the step 7102. In the video signal reproducing subroutine, the video signal from the position specified by the VARA to the position specified by the TARA is reproduced. This will be further explained later. The P decoding has thus been described.

The V(0) decoding is now explained. In a step 7213, the VS of the reference line is inputted and the transition point $b_1$ on the right of $a_0$ is detected. In a decision step 7214, the presence or absence of the transition point is checked. If the transition point exists, the process goes to a step 7218, and if it does not exist, the process goes to a step 7215. In the step 7215, the byte address of the VARB is incremented. In a decision step 7216, the line end is checked, and if the line end is detected, the line end is set as $b_1$ and the process goes to a step 7218. If the line end is not detected, the process goes to a step 7217. In the step 7217, the VS of the reference line is inputted and the $b_1$ is detected, and then the process returns to the decision step 7214. If the $b_1$ exists, the process goes to a step 7218 where the word address of the VARB and the bit address of the transition point of the reference line are written into the TARA as $a_1$, and in a step 7219, the video signal reproducing subroutine is called. In a step 7220, the $a_0$ color is reversed and the process returns to the step 7102. The V(0) decoding has thus been described.

The VL decoding is now explained. In a step 7301, the VS of the reference line is inputted and the $b_1$ on the right of $a_0$ is detected. In a decision step 7302, if the transition point exists, the process goes to a step 7306, and if it does not exist, the process goes to a step 7303. In the step 7303, the word address of the VARB is incremented. In a decision step 7304, the line end is checked and if the line end is detected, the line end is set as $b_1$ and the process goes to a step 7305'. If the line end is not detected, the process goes to a step 7305 where the VS of the reference line is inputted, the $b_1$ is detected and the process goes to a decision step 7302. If the transition point exists, the process goes to a step 7306 where the bit address of the transition point of the reference line is stored in the VARB to store the position of $b_1$ in the VARB. In a step 7305', the difference between $b_1$ and $a_1$ latched in the latch 2515 is supplied to the A port of the ALU 2350, the content of the VARB is latched in the B latch 2330, the B mask 2342 is deactivated and the output of the B latch 2330 is supplied to the B port of the ALU 2350, and the operation (B−A) is carried out to obtain ($b_1$-difference$=a_1$), which is stored in the TARA. Since the output of the decoding table is directly applied to the ALU 2350, the position of $a_1$ can be quickly determined. In a decision step 7306', if the operation result of the ALU 2350 is negative, an error is determined. In a decision step 7307, (TARA−VARA) is checked, and if it is negative, an error is determined. In a step 7308, the video signal reproducing subroutine is called. In a step 7309, the content of the VARA is written into the VARB to coincide the positions of the new $a_0$ and the $b_0$. In a step 7310, the $a_0$ color is reversed and the process returns to the step 7102. The VL processing has thus been described.

The VR decoding is now explained. In a step 7311, the VS of the reference line is inputted and the transition point $b_1$ on the right of $a_0$ is checked. In a decision step 7312, if the transition point exists, the process goes to a step 7315, and if it does not exist, the process goes to a step 7312'. In the step 7312', the word address of the VARB is incremented. In a step 7313, the line end is checked, and if the line end is detected, the error processing is started. If the line end is not detected, the process goes to a step 7314. In the step 7314, the VS of the reference line is inputted, the $b_1$ is detected and the process goes to a decision step 7312. If the transition point exists, the process goes to a step 7315 where the bit address of the transition point of the reference line is stored in the VARB. In a step 7316, the difference from the decoding table and the VARB are added and the sum is stored in the TARA as $a_1$. In a decision step 7317, if the sum overflows, the error processing is started. If it does not overflow, the video signal reproducing subroutine is called in a step 7318, and in a step 7319, the content of the TARA is transferred to the VARB to coincide the new $a_0$ with $b_0$. In a step 7320, the $a_0$ color is reversed and the process returns to the step 7102. The VR decoding has thus been described.

The H decoding is now explained. In a step 7401, the address generator 2513 generates a start address for the MH code decoding. When the decoding table ROM is configured as shown in Table 3, if the $a_0$ color is white, $A_9-A_1$ are set to "000000000" and if the $a_0$ color is black, they are set to "010000000". In a step 7402, the processing A is carried out to find the MH code. In a decision step 7403, the $D_7$ bit of the decoding table ROM 2514 latched in the latch 2515 is checked, and if it is "0", it is determined as the terminating code and the process goes to a step 7406. If it is "1", it is determined as the make-up code and the process goes to a step 7404. In the step 7404, the outputs $D_1-D_7$ of the latch 2515 are supplied to the A port of the ALU 2350 as the $2^6-2^{11}$ bits of the RL and they are added to the content of the TARA, and the sum is written into the TARA. In a decision step 7405, the sum is checked, and if it overflows, the error processing is started, and if it does not overflow, the process goes to a step 7401. If the terminating code is detected, the process goes to a step 7406 where the outputs $D_1-D_6$ of the latch 2515 are supplied to the A port of the ALU 2350 as the $2^0-2^5$ bits of the RL and they are added to the content of the TARA and the sum is written into the TARA. In a decision step 7407, the sum is checked, and if it overflows, the error process is started, and if it does not overflow, the process goes to a step 7408. In the step 7408, the video signal reproducing subroutine is called, and in a step 7409, the $a_0$ color is reversed. In a step 7410, the processing B is carried out. In a step 7411, the content of the TARA is transferred to the VARB to coincide the new $a_0$ with $b_0$, and the process goes to a step 7102. The decoding operations for all modes have thus been described.

The video signal reproducing subroutine is now explained. The $a_0$ is stored in the VARA and the $a_1$ is stored in the TARA. Thus, the bits from the position specified by the VARA up to the position specified by the TARA are to be changed to the $a_0$ color. In a step 7412, the word address difference between the VARA and the TARA is calculated. It is effected by latching the VARA in the A latch 2320, latching the TARA in the B latch 2330, activating the A mask 2341 and the B mask 2342 and supplying the outputs thereof to the ALU 2350 to carry out the operation (B−A). If the operation result is zero, there is no word difference. Because of the circuits to mask the bit address, the word address difference can be quickly determined. Since the word difference signal and the bit addresses of the start and end points of writing are supplied to the video signal generating circuit 2701, the interword video signal can be quickly reproduced by supplying a latch pulse to the latch 2704 and the temporary register 2702 in a step 7413. In a decision step 7414, the word address difference is checked, and if the word address difference is zero, it means that the video signal has been reproduced up to the point $a_1$ specified by the TARA, and the process returns. If there is a word address difference, the process goes to a step 7415. If the word difference exists, it means that one word of video signal has been reproduced in the latch 2704, and the output of the latch is written at the address specified by the word address (VARA+SARA) in a step 7415. In a step 7416, the temporary register 2702 is cleared. In a step 7417, the word address of the VARA is incremented. It is carried out by latching the content of the VARA in the A latch 2320, latching the content of the TARB in the B latch 2330, activating the A mask 2341 and supplying the output thereof to the A port of the ALU 2350, supplying "8" to the B port of the ALU 2350, carrying out the operation (A+B) and writing the sum into the VARA. Thus, the word address of the VARA is incremented, the bit address of the VARA is cleared and the line end is detected by the comparator 2370 simultaneously. In a decision step 7418, the line end is checked. If the line end is not detected, the process returns to the step 7412 to continue the video signal reproducing. If the line end is detected, the process goes to a decision step 7419 where the coincidence of the VARA and the TARA is checked. If they are not coincident, the error processing is started, and if they are coincident, the line end processing is started.

The microprogram flow of the MR decoding has thus been described.

FIGS. 27 and 28 show a facsimile which comprises a Codec and a microcomputer.

In FIG. 27, a V bus of a Codec 2000 is stored by a system bus of a microcomputer 8010. The microcomputer (MPU) 8010 may be a general purpose microcomputer such as Intel 8085 or Motorola 6800. The microcomputer 8010 sets appropriate parameters to the Codec 2000 and issues macrocommands. For the encoding operation, it issues a scan command to a scanner 1000. When the scanner 1000 receives the scan command from the microcomputer 8010, it scans an original document to produce a video signal (VS). It also sends a TDRQT to the Codec 2000. The Codec 2000 transfers the VS supplied from the scanner 1000 to a video memory (VM) 8020 by DMA in a manner explained in FIG. 15. After one line of transfer, the Codec 2000 sends an interrupt request (IRQ) to the microcomputer 8010. In this manner, the microcomputer 8010 can transfer one line of VS by setting the parameters to the Codec only once per line. When the microcomputer 8010 issues the encoding macrocommand to the Codec 2000, the Codec 2000 receives the VS from the VM to encode it and supplies the code to the D bus of the microcomputer 8010. The microcomputer 8010 stores the code in a code memory 8030. The microcomputer 8010 also supplies the code in the code memory 8030 to a modem 3000. In this manner, the facsimile transmitter is readily constructed. A receiver can also be constructed similarly in the system. Since the system bus of the microcomputer 8010 and the video bus of the code are shared, the VM 8020 and the code memory 8030 may be mounted on the same chip so that the compactness and the cost reduction of the system are attained.

FIG. 28 shows a system having separate system bus of the microcomputer 8010 and video bus of the Codec 2000. The video signal is transferred on the V bus and the code is transferred on the system bus. Accordingly, high speed encoding and decoding operation is attained. A DMAC 8060 is connected to the system bus and the code is transferred by the DMAC 8060. Accordingly, the load to the microcomputer is further relieved. Since the VM 8020 is independent from the address space of the microcomputer 8010, the VM is not limited to a 64K-byte space which is a common address space of the 8-bit microcomputer and a larger capacity VM may be used. For example, by providing a 24-bit configuration hardware in the VA generator 2400, the VA space of the Codec can be expanded to 16 M bytes.

While the application of the present invention to the facsimile has been specifically explained, the present invention may be applied to any system which handles the MH code or the MR code, or both. For example, it may be applied to a video file system. By adding, a refresh timing generator and a refresh address register, a refresh RAM can be used as the VM.

The present invention offers the following advantages.

Because of the provision of the microcomputer bus interface (I/F), the system can be directly connected to the microcomputer bus and the system can be constructed in a small size.

Because the video bus (VB) and the system bus (SB) are shared, the code memory and the video memory can be shared.

Since the video bus (VB) can be separated from the system bus (SB), the code and the video signal can be transferred on the different buses and the high speed processing is attained. The video memory is not limited to the address space of the microcomputer and hence the large capacity VM may be used.

Since the Codec has the microprogram and the sequencer, the Codec is operated by the macrocommand issued by the microcomputer once per line or page. Accordingly, the load to the microcomputer is relieved.

Since the parameters are set in the registers of the Codec from the microcomputer, flexible processing is attained.

Because of the provision of the HWR, LNR, SAR and TR, any rectangular area on a screen can be processed.

Since the detection of the transition point and the decoding of the video signal are parallelly processed, high speed processing is attained.

Since the ALU of the EXU, the table unit, the transition point detector and the video signal generator are directly coupled, high speed processing is attained.

Since the EXU adopts the virtual addressing scheme, the hardware of the EXU is reduced and high speed operation is attained.

Since both the word address and the bit address are simultaneously handled, the transition point processing is quickly done.

Since the timing is centrally controlled by the control unit including the microprogram and the sequencer, the system design is facilitated and the LSI implementation is facilitated.

Because of the provision of the independent decoding/encoding channel and transfer channel, any portion of the video signal (VS) from the scanner can be encoded and any position of the decoded VS can be transferred to the recorder.

We claim:

1. An encoding/decoding system having means for inputting and outputting a video signal and an encoded word signal, means for detecting positions of color information transition points in the input video signal, means for generating a code word by referring to an encoding table by a difference between positions of two color information transition points and means for generating the video signal by referring to a decoding table by the input code word, said system comprising:

a video memory address generator for accessing a video memory containing the video signal to be encoded and the decoded video signal as multi-bit words;

a transition point detection unit for parallelly detecting the bit addresses of the color information transition points in the video signal supplied from said video memory word by word;

an execution unit having an ALU and registers for calculating a run length or a relative address difference based on the address difference between two color information transition points and calculating color information transition addresses based on said run length or said relative address difference;

a table unit having an encoding table for outputting a code word corresponding to said run length or said relative address difference supplied from said execution unit and a decoding table for outputting the run length or the relative address difference based on the input code word;

a video signal generator for parallelly reproducing the video signal, word by word, based on the address and the color information supplied from said execution unit;

a control unit having a microprogram memory and a sequencer for controlling the operations of said units; and an interface unit for connecting said units to external microcomputer bus and video bus.

2. A encoding/decoding system according to claim 1 wherein said registers of said execution unit include a virtual address register for storing a virtual address of an encoding line or a decoding line with start point of the line being address zero, a virtual address register for storing a virtual address of a reference line, a virtual address register for storing a virtual address of a transfer line, a temporary address register for storing a virtual address of the color information transition point of the encoding line or the decoding line and a temporary address register for storing a virtual address of the color information transition point of the reference line, and said video memory address generator includes a start address register for storing a real word address of the video memory at a start point of the encoding line or the decoding line, a start address register for storing a real word address of the video memory at a start point of the reference line, a start address register for storing a real word address of the video memory at a start point of the transfer line and an adder for adding the line start point address supplied from said start address register to the virtual word address supplied from said execution unit to generate a video memory address.

3. An encoding/decoding system according to claim 1 wherein said transition point detection unit includes an inverter for inverting the color information of the video signal supplied from the video memory word by word, a selector responsive to a transition point signal and the color information signal for selecting one of the video signal, the inverted video signal and the video signal latched in a latch, said latch temporarily latching the selected video signal, a transition point bit address detector for detecting the transition point in the video signal supplied from said latch parallelly word by word, to produce said transition point signal and a transition point bit address signal and a circuit responsive to said transition point signal for inverting the color information of the video signal latched in said latch and erasing the transition point.

4. An encoding/decoding system according to claim 1 wherein said video signal generator includes a video signal generating circuit for repeatedly and parallelly producing the video signal in one word based on a word address difference signal, a start bit address of writing and an end bit address of writing and a register for combining and storing the repeatedly reproduced video signals.

*5. An encoding system, for encoding digital video signals in a redundancy reduction code, said encoding system comprising:*

*encoding means for receiving digital video signals and converting the received signals into redundancy reduction encoded signals;*

*video memory means for storing the digital video signals until the encoding means performs the converting;*

*a video bus for transmitting signals between the encoding means and the video memory means;*

*code memory means for storing the redundancy reduction encoded signals from the encoding means;*

*a system bus for transmitting signals between the encoding means and the code memory means; and*

*control means for controlling operation of the encoding means.*

*6. An encoding system according to claim 5, wherein the video bus and the system bus are coupled.*

*7. An encoding system according to claim 5, wherein the video bus and the system bus are separated.*

*8. An encoding system, for encoding digital video signals in a redundancy reduction code, using digital video signals in a reference line and in an encoding line, said encoding system comprising:*

*video memory means for storing the digital video signals;*

*encoding means for accessing the video memory means to obtain a multi-bit word, for detection of color information transition points in the obtained multi-bit word and generation of a redundancy reduction encoded signal on the basis of the color information transition points; and*

*control means for controlling operation of the encoding means.*

*9. An encoding system for encoding digital video signals in a redundancy reduction code, using digital video signals in a reference line and in an encoding line, said encoding system comprising:*

*a scanner for generating digital video signals;*

*video memory means for storing the digital video signals;*

*encoding means for receiving digital video signals from the video memory means and converting the received signals into redundancy reduction code encoded signals; and*

*control means for transferring the digital video signals between the scanner and the video memory means in response to an interrupt signal from the scanner.*

*10. An encoding system comprising:*

*a video memory for storing a video signal;*

*encoding means for receiving from said video memory a plurality of bits of the video signal as one word, detecting in parallel transition points in color in a plurality of received words, and preparing a code on the basis of the transition points; and*

*control means for controlling said encoding means.*

*11. Apparatus comprising:*

*means for inputting a video signal obtained by reading information from a document; and*

*means for performing encoding and/or decoding processing of the video signal in parallel on the basis of a plurality of bits.*

*12. Apparatus as claimed in claim 11, wherein the apparatus is a facsimile apparatus.*

* * * * *